United States Patent
Lee et al.

(10) Patent No.: US 11,924,677 B2
(45) Date of Patent: Mar. 5, 2024

(54) METHOD AND APPARATUS FOR HANDLING PACKET DUPLICATION BASED ON CONGESTION LEVEL OF FREQUENCY IN A WIRELESS COMMUNICATION SYSTEM

(71) Applicant: LG ELECTRONICS INC., Seoul (KR)

(72) Inventors: Youngdae Lee, Seoul (KR); Sunyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 327 days.

(21) Appl. No.: 17/309,978

(22) PCT Filed: Jan. 31, 2020

(86) PCT No.: PCT/KR2020/001521
§ 371 (c)(1),
(2) Date: Jul. 7, 2021

(87) PCT Pub. No.: WO2020/159307
PCT Pub. Date: Aug. 6, 2020

(65) Prior Publication Data
US 2022/0070724 A1    Mar. 3, 2022

(30) Foreign Application Priority Data

Feb. 1, 2019   (KR) .......... 10-2019-0013938
Feb. 1, 2019   (KR) .......... 10-2019-0013973
Feb. 1, 2019   (KR) .......... 10-2019-0014013

(51) Int. Cl.
*H04W 28/02*   (2009.01)
*H04L 1/08*    (2006.01)
*H04W 24/08*   (2009.01)

(52) U.S. Cl.
CPC .......... *H04W 28/0289* (2013.01); *H04L 1/08* (2013.01); *H04W 24/08* (2013.01)

(58) Field of Classification Search
None
See application file for complete search history.

(56) References Cited

U.S. PATENT DOCUMENTS 10,524,277 B2 * 12/2019 Kubota ............ H04W 72/1215
11,184,945 B2 * 11/2021 Yi .................. H04W 76/38
(Continued)

FOREIGN PATENT DOCUMENTS

WO    2017182927    10/2017

OTHER PUBLICATIONS

PCT International Application No. PCT/KR2020/001521, International Search Report dated May 12, 2020, 2 pages.
(Continued)

*Primary Examiner* — Christopher T Wyllie
(74) *Attorney, Agent, or Firm* — LEE, HONG, DEGERMAN, KANG & WAIMEY

(57) ABSTRACT

A method and apparatus for handling packet duplication based on congestion level of frequency in a wireless communication system is provided. A wireless device configures at least two lower entities associated with an upper entity. A wireless device activates packet duplication in the upper entity for multiple frequencies. A wireless device submits a data unit to at least one lower entity among the at least two lower entities based on a congestion level of at least one frequency among the multiple frequencies. A wireless device performs transmission of the data unit.

6 Claims, 15 Drawing Sheets

(56) References Cited

U.S. PATENT DOCUMENTS

| | | | | |
|---|---|---|---|---|
| 2011/0263297 | A1* | 10/2011 | Kaaja | G06K 7/10475 |
| | | | | 340/10.2 |
| 2016/0198422 | A1* | 7/2016 | Panta | H04W 52/44 |
| | | | | 370/311 |
| 2016/0309481 | A1* | 10/2016 | Verma | H04W 76/15 |
| 2017/0374579 | A1* | 12/2017 | Wang | H04W 28/0278 |
| 2018/0035318 | A1* | 2/2018 | Liu | H04W 24/02 |
| 2018/0049083 | A1* | 2/2018 | Kubota | H04W 74/0833 |
| 2018/0213589 | A1* | 7/2018 | Wu | H04W 76/20 |
| 2018/0309660 | A1* | 10/2018 | Loehr | H04L 45/14 |
| 2018/0310202 | A1* | 10/2018 | Löhr | H04W 28/065 |
| 2019/0261216 | A1* | 8/2019 | Lee | H04L 47/11 |
| 2020/0008113 | A1* | 1/2020 | Chen | H04W 36/0038 |
| 2020/0029389 | A1* | 1/2020 | Yilmaz | H04W 8/08 |
| 2020/0120522 | A1* | 4/2020 | Xiao | H04W 76/27 |
| 2020/0145895 | A1* | 5/2020 | Dash | H04W 40/246 |
| 2020/0359276 | A1* | 11/2020 | Lee | H04W 36/0085 |
| 2021/0298120 | A1* | 9/2021 | Sharma | H04W 80/02 |
| 2021/0337593 | A1* | 10/2021 | Fujishiro | H04W 24/08 |
| 2022/0014960 | A1* | 1/2022 | Lee | H04L 5/001 |
| 2022/0159773 | A1* | 5/2022 | Ingale | H04W 36/0069 |

OTHER PUBLICATIONS

Aijaz, "Packet Duplication in Dual Connectivity Enabled 5G Wireless Networks: Overview and Challenges," arXiv:1804.01058v1, Apr. 2018, 10 pages.

Catt, "Impact of PDCP duplication on RLC," R2-1706376, 3GPP TSG-RAN WG2 Meeting #NR AH2, Jun. 2017, 5 pages.

ZTE, "Considerations on PDCP duplication and routing for NR-U," R2-1816840, 3GPP TSG RAN WG2 NR #104 Meeting, Nov. 2018, 4 pages.

Huawei et al., "PDCP Duplication with More than two RLC Channels," R2-1817510, 3GPP TSG-RAN WG2#104, Nov. 2018, 5 pages.

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.4.0, Dec. 2018, 363 pages.

3rd Generation Partnership Project, "Technical Specification Group Radio Access Network; NR; Packet Data Convergence Protocol (PDCP) specification (Release 15)," Section 5.11 of 3GPP TS 38.323 V15.4.0, Dec. 2018, 26 pages.

3rd Generation Partnership Project, "Technical Specification Group Radio Access Network; Evolved Universal Terrestrial Radio Access (E-UTRA); Physical layer; Measurements (Release 15)," Sections 5.1.30 and 5.1.31 of 3GPP TS 36.214 V15.3.0, Sep. 2018, 25 pages.

* cited by examiner

METHOD AND APPARATUS FOR HANDLING PACKET DUPLICATION BASED ON CONGESTION LEVEL OF FREQUENCY IN A WIRELESS COMMUNICATION SYSTEM

CROSS-REFERENCE TO RELATED APPLICATIONS

This application is the National Stage filing under 35 U.S.C. 371 of International Application No. PCT/KR2020/001521, filed on Jan. 31, 2020, which claims the benefit of earlier filing date and right of priority to KR Application Nos. 10-2019-0014013, filed on Feb. 1, 2019, 10-2019-0013938, filed on Feb. 1, 2019, and 10-2019-0013973, filed on Feb. 1, 2019, the contents of which are all hereby incorporated by reference herein in their entireties.

TECHNICAL FIELD

The present disclosure relates to a method and an apparatus for handling packet duplication based on congestion level of frequency in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

The main motivations for V2X are road safety, traffic efficiency, and energy savings. There are two types of V2X communication technology depending on the underlying technology being used, i.e. wireless local area network (WLAN)-based, and cellular-based.

Packet data convergence protocol (PDCP) packet duplication was introduced in 3GPP rel-15, especially for V2X communication. PDCP packet duplication is configured for a radio bearer (RB) by radio resource control (RRC) where two logical channels are configured for the RB. When activated, PDCP packet duplication allows sending the same PDCP protocol data unit (PDU) on two independent transmission paths: via the primary radio link control (RLC) entity and a secondary RLC entity, thus increasing reliability and reducing latency.

SUMMARY

For NR-U, a wireless device may be configured with Dual Connectivity. A wireless device may be configured with Master Cell Group (MCG) on licensed carriers while configured with Secondary Cell Group (SCG) on unlicensed carriers. Otherwise, a wireless device may be configured with MCG on unlicensed carriers while configured with SCG on unlicensed carriers.

A wireless device, supporting such dual connectivity with NR-U, may be configured with a split bearer in which packet duplication may be activated. In this case, transmissions of duplicated packets on unlicensed carriers would increase channel occupancy.

Wireless devices, supporting sidelink communication, could perform sidelink transmission and reception. For V2X sidelink duplication, if ProSe per-packet reliability (PPPR) above a threshold is configured, a wireless device may activate packet duplication for the packet. However, if congestion occurs, packet duplication will increase congestion because a wireless device will double the amount of resources used for packet transmission.

Therefore, studies for handling packet duplication based on congestion level of frequency in a wireless communication system will be required.

In an aspect, a method performed by a wireless device in a wireless communication system is provided. The wireless device configures at least two lower entities associated with an upper entity. The wireless device activates packet duplication in the upper entity for multiple frequencies. The wireless device submits a data unit to at least one lower entity among the at least two lower entities based on a congestion level of at least one frequency among the multiple frequencies. The wireless device performs transmission of the data unit.

In another aspect, a wireless device in a wireless communication system is provided. The wireless device includes a transceiver, a memory, and at least one processor operatively coupled to the transceiver and the memory. The at least one processor is configured to configure at least two lower entities associated with an upper entity. The at least one processor is configured to activate packet duplication in the upper entity for multiple frequencies. The at least one processor is configured to submit a data unit to at least one lower entity among the at least two lower entities based on a congestion level of at least one frequency among the multiple frequencies. The at least one processor is configured to control the transceiver to perform transmission of the data unit.

The present disclosure can have various advantageous effects.

According to some embodiments of the present disclosure, a wireless device could handle packet duplication depending on measurement results.

For example, a wireless device, which is configured with a split bearer, could activate or deactivate packet duplication based on congestion level to provide proper control of congestion.

For example, a wireless device may deactivate packet duplication, when congestion level becomes high on a carrier where the duplicated packets are transmitted.

For example, a wireless device could provide a dynamic control of activation or deactivation of packet duplication based on congestion level.

For example, it could be prevented to increase the congestion level of a certain resource by packet duplication.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Figure 1:
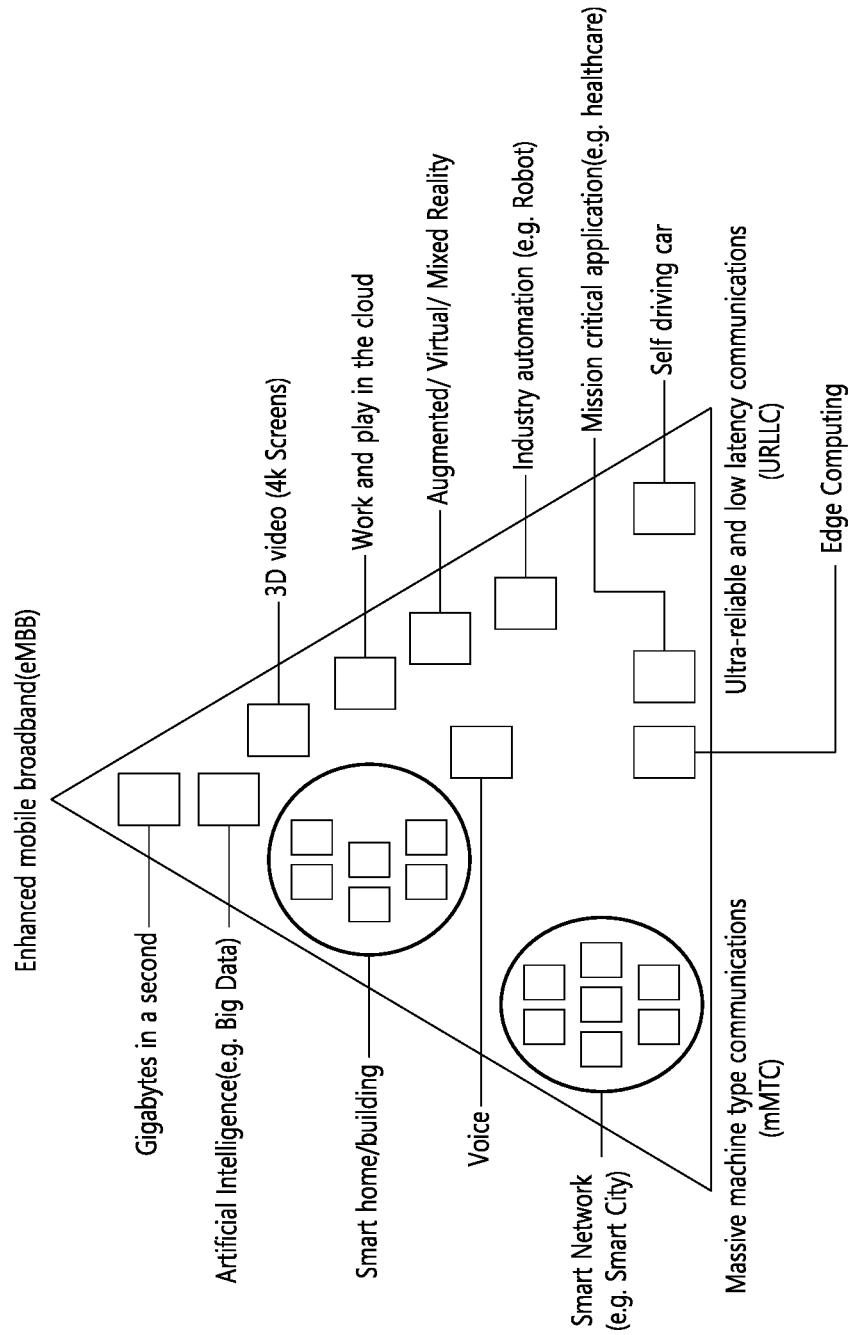
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Figure 2:
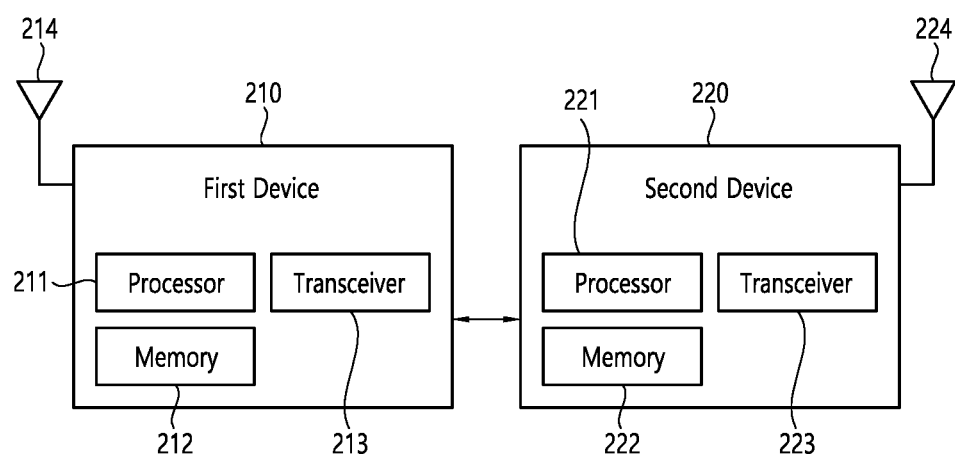
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
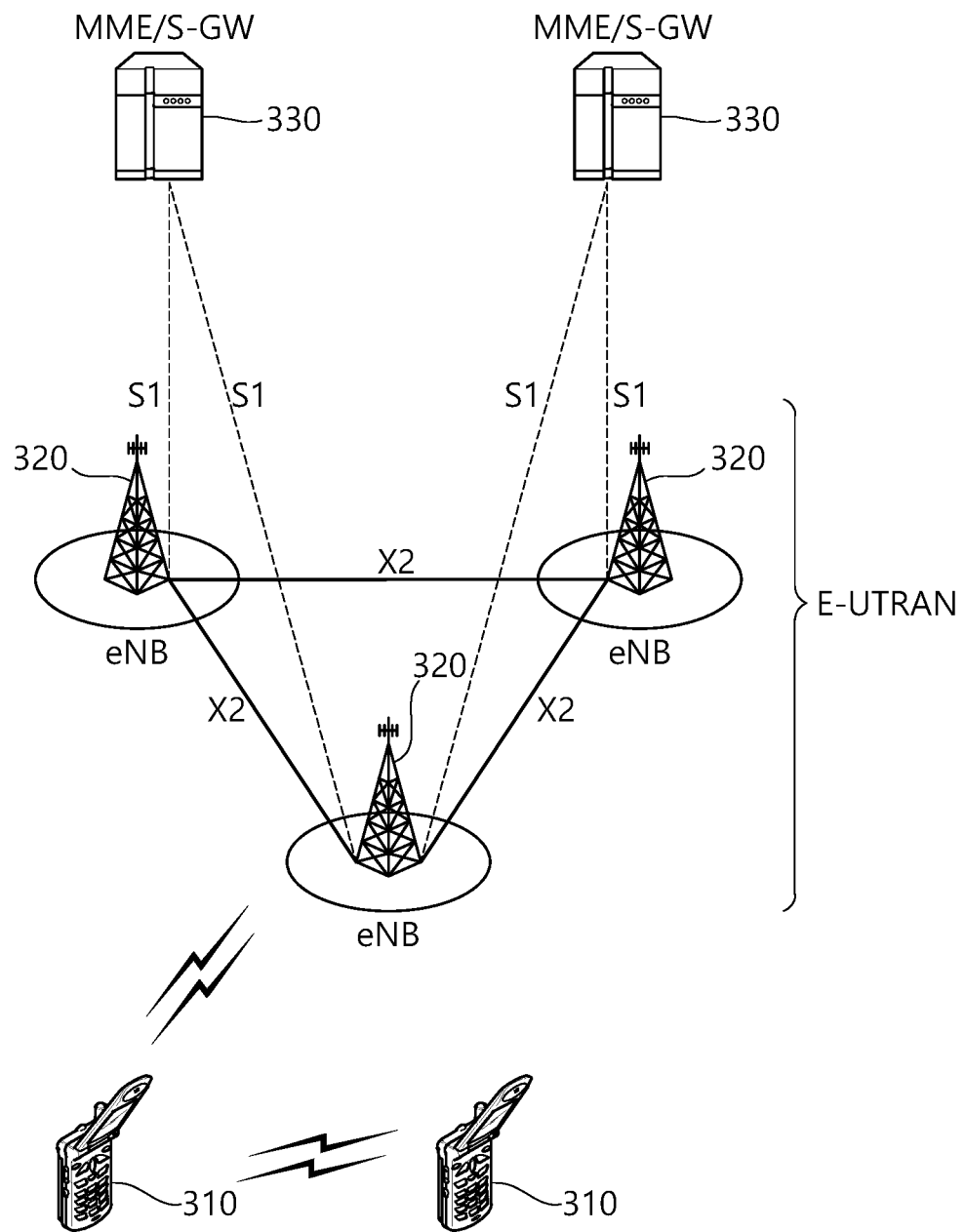
FIG. 3 shows another example of a wireless communication system to which the technical features of the present disclosure can be applied.

FIG. 3 shows another example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
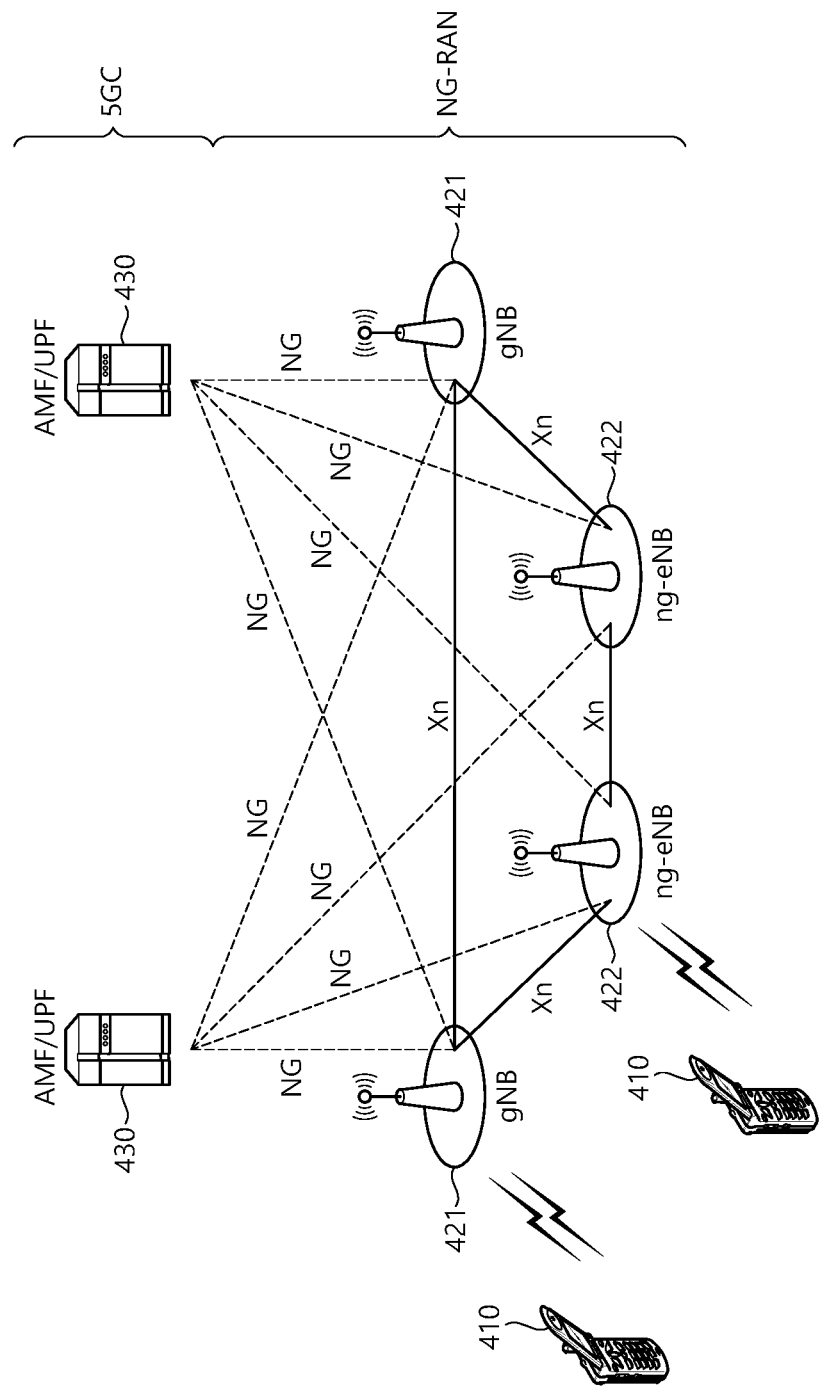
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
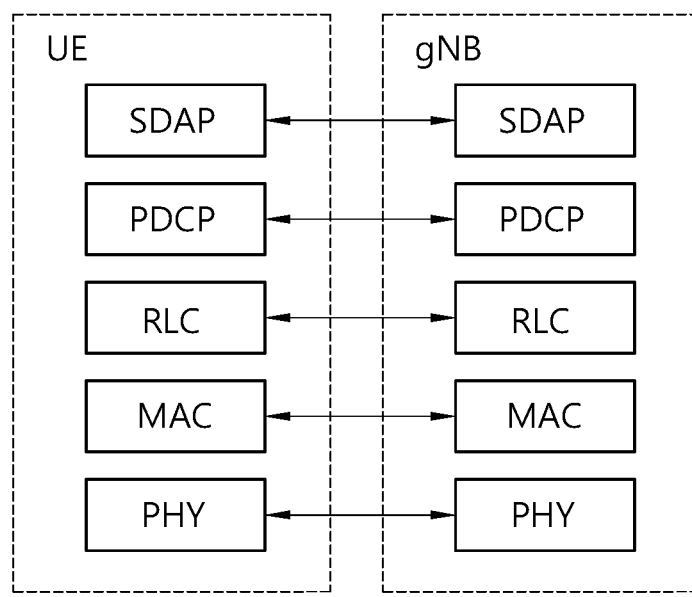
FIG. 5 shows a block diagram of a user plane protocol stack to which the technical features of the present disclosure can be applied.
Figure 6:
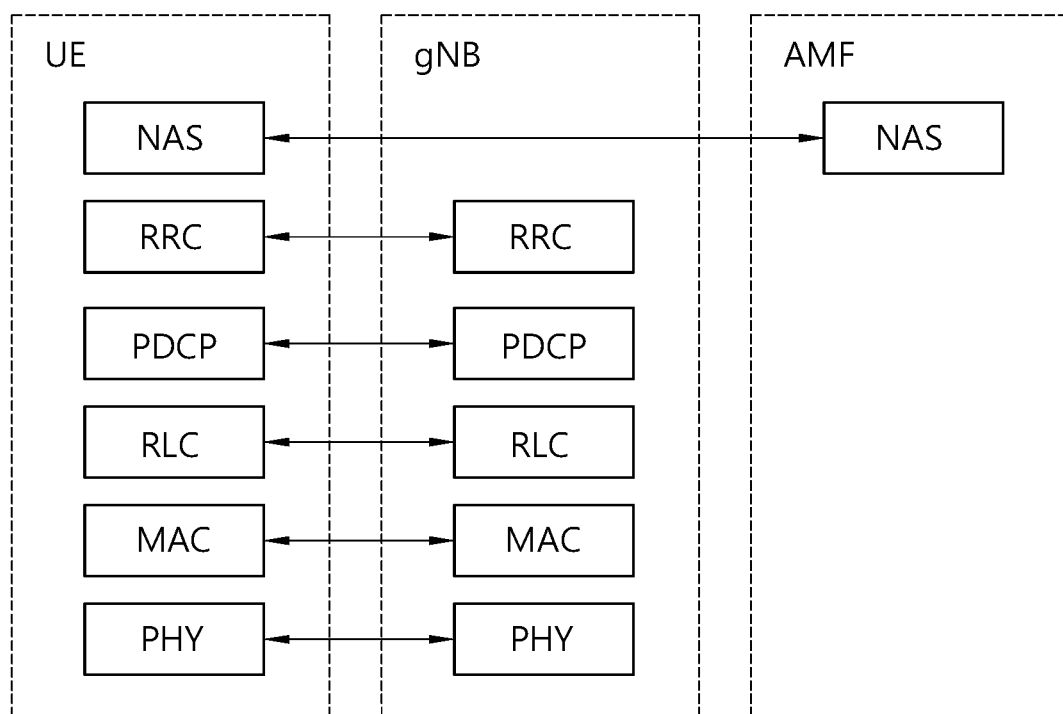
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Examples of sidelink communication are described next. These techniques may encompass certain aspects of V2X sidelink communication, but are not limited thereto. Sidelink communication in the scenario of V2X communications (V2X sidelink communication) will be provided further below, following the description of more general sidelink communication.

In some implementations, the examples of sidelink communication described below may be compliant with 3GPP technical standard TS 3GPP TS 36.300 V15.4.0 (2018-12), Section 23.10. In some scenarios, sidelink communication generally encompasses a UE to UE interface for sidelink communication, vehicle-to-everything (V2X) sidelink communication and sidelink discovery. In some implementations, the sidelink corresponds to the PC5 interface. Sidelink transmissions may be defined for sidelink discovery, sidelink communication, and V2X sidelink communication between UEs. In some implementations, sidelink transmissions use the same frame structure as the frame structure that is defined for UL and DL when UEs are in network coverage. However, in some scenarios, the sidelink transmission may be restricted to a sub-set of the UL resources in the time and frequency domains. Various physical channels, transport channels, and logical channels may be implemented and utilized for sidelink transmission.

In some implementations, sidelink communication is a mode of communication whereby UEs can communicate with each other directly over the PC5 interface. This communication mode is supported when the UE is served by E-UTRAN and when the UE is outside of E-UTRA coverage. In some scenarios, only those UEs authorized to be used for public safety operation can perform sidelink communication. The terminology "sidelink communication" without "V2X" prefix may, in some scenarios, only concern public safety unless specifically stated otherwise.

In order to perform synchronization for out of coverage operation, the UE(s) may act as a synchronization source by transmitting a sidelink broadcast control channel (SBCCH) and a synchronization signal. In some scenarios, SBCCH carries the most essential system information needed to receive other sidelink channels and signals. In some implementations, SBCCH along with a synchronization signal is transmitted with a fixed periodicity of 40 ms. When the UE is in network coverage, the contents of SBCCH may be derived from the parameters signaled by the BS. When the UE is out of coverage, if the UE selects another UE as a synchronization reference, then the content of SBCCH may be derived from the received SBCCH.

Otherwise, in some implementations, the UE uses pre-configured parameters. For example, system information block type-18 (SIB18) provides the resource information for the synchronization signal and SBCCH transmission. In some scenarios, there are two pre-configured subframes every 40 ms for out of coverage operation. The UE may receive the synchronization signal and SBCCH in one subframe and transmit synchronization signal and SBCCH on another subframe if the UE becomes a synchronization source based on a criterion.

In some implementations, the UE performs sidelink communication on subframes defined over the duration of sidelink control (SC) period. The SC period is the period over which resources allocated in a cell for sidelink control information (SCI) and sidelink data transmissions occur. Within the SC period, the UE sends SCI followed by sidelink data. SCI indicates a Layer 1 ID and characteristics of the transmissions (e.g., modulation and coding scheme (MCS), location of the resource(s) over the duration of SC period, timing alignment).

In some implementations, the UE performs transmission and reception over Uu and PC5 with the following decreasing priority order in case sidelink discovery gap is not configured:
   Uu transmission/reception (highest priority);
   PC5 sidelink communication transmission/reception;
   PC5 sidelink discovery announcement/monitoring (lowest priority).

In some implementations, the UE performs transmission and reception over Uu and PC5 with the following decreasing priority order in case sidelink discovery gap is configured:
   Uu transmission/reception for RACH;
   PC5 sidelink discovery announcement during a sidelink discovery gap for transmission;
   Non-RACH Uu transmission;
   PC5 sidelink discovery monitoring during a sidelink discovery gap for reception;
   Non-RACH Uu reception;
   PC5 sidelink communication transmission/reception.

A UE supporting sidelink communication may, in some implementations, operate in two modes for resource allocation. The first mode is a scheduled resource allocation mode, which may be referred to as "Mode 1" for resource allocation of sidelink communication. In Mode 1, the UE needs to be RRC_CONNECTED in order to transmit data. The UE requests transmission resources from a base station (BS) and the BS schedules transmission resources for transmission of sidelink control information and sidelink data. The UE sends a scheduling request (e.g., a dedicated scheduling request (D-SR) or random access) to the BS followed by a sidelink buffer status report (BSR). Based on the sidelink BSR, the BS may determine that the UE has data for a sidelink communication transmission, and may estimate the resources needed for transmission. The BS may then schedule transmission resources for sidelink communication using a configured sidelink radio network temporary identity (SL-RNTI). Therefore, in such scenarios, a UE that is in the RRC_CONNECTED state and that is to perform a sidelink communication may send a sidelink UE information message to a BS. In response, the BS may configure the UE with a SL-RNTI.

The second mode of resource allocation for sidelink communication is a UE autonomous resource selection mode, which may be referred to as "Mode 2" for resource allocation of sidelink communication. In Mode 2, a UE selects resources from one or more resource pools and performs selection of a transport format to transmit sidelink control information and data. In some scenarios, there may be up to 8 transmission resource pools either pre-configured for out of coverage operation or provided by RRC signaling for in-coverage operation. Each resource pool may have one or more priority levels (e.g., one or more ProSe per-packet priority (PPPP)) associated with it. As an example, for transmission of a MAC PDU, the UE selects a transmission pool in which one of the associated PPPP is equal to the PPPP of a logical channel with highest PPPP among the logical channel identified in the MAC PDU. In some implementations, it is up to UE implementation how the UE selects amongst multiple pools with same associated PPPP. There is a one to one association between sidelink control pool and sidelink data pool. Once the resource pool is selected, in some scenarios, the selection is valid for an entire sidelink control (SC) period. After the SC period is finished, the UE may perform resource pool selection again. The UE is allowed to perform multiple transmissions to different destinations in a single SC period.

Having provided various examples of general sidelink communication above, next, some examples of sidelink communication in the scenario of V2X communications (V2X sidelink communication) are described.

In some implementations, the techniques of V2X sidelink communication described below may be compliant with technical standard 3GPP TS 36.300 V15.4.0 (2018-12), e.g., Section 23.14. In general, V2X services may consist of various types, such as vehicle-to-vehicle (V2V) services, vehicle-to-infrastructure (V2I) services, vehicle-to-nomadic (V2N) services, and vehicle-to-pedestrian (V2P) services.

V2X services may be provided by PC5 interface and/or Uu interface, according to some implementations. Support of V2X services via PC5 interface is provided by V2X sidelink communication, which is a mode of communication whereby UEs communicate with each other directly over the PC5 interface. This communication mode is supported when the UE is served by E-UTRAN and when the UE is outside of E-UTRA coverage. In some implementations, only UEs that are authorized for V2X services may perform V2X sidelink communication.

V2X sidelink communication may implement and utilize a user plane protocol stack and functions for sidelink communication. In addition, according to some implementations of V2X sidelink communication:
   Sidelink traffic channel (STCH) for sidelink communication is also used for V2X sidelink communication.
   Non-V2X (e.g., public safety related) data is not multiplexed with V2X data transmitted in resources configured for V2X sidelink communication.
   The access stratum (AS) is provided with the PPPP and ProSe per-packet reliability (PPPR) of a protocol data unit transmitted over PC5 interface by higher layers. The packet delay budget (PDB) of the protocol data unit can be determined from the PPPP. The low PDB is mapped to the high priority PPPP value.
   The AS is provided with a transmit profile of a protocol data unit transmitted over PC5 interface by upper layers.
   The logical channel prioritization based on PPPP is used for V2X sidelink communication.
   Control plane protocol stack for SBCCH for sidelink communication is also used for V2X sidelink communication.

A UE supporting V2X sidelink communication may, in some implementations, operate in two modes for resource allocation. The first mode is a scheduled resource allocation, which may be referred to as "Mode 3" for resource allocation of V2X sidelink communication. In Mode 3, the UE needs to be RRC_CONNECTED in order to transmit data. The UE requests transmission resources from a BS, and the BS schedules transmission resources for transmission of sidelink control information and data. Sidelink semi-persistent scheduling (SPS) is supported for the Mode 3.

The second mode of resource allocation for V2X sidelink communication is a UE autonomous resource selection, which may be referred to as "Mode 4" for resource allocation of V2X sidelink communication. In Mode 4, the UE selects resources from one or more resource pools and performs selection of transport format to transmit sidelink control information and data. In scenarios where mapping between the zones and V2X sidelink transmission resource pools is configured, the UE selects a V2X sidelink resource pool based on the zone in which the UE is located. The UE may perform sensing for selection (or re-selection) of sidelink resources. Based on the sensing results, the UE may select (or re-select) specific sidelink resources and may reserve multiple sidelink resources. In some scenarios, up to 2 parallel independent resource reservation processes are allowed to be performed by the UE. The UE is also allowed to perform a single resource selection for its V2X sidelink transmission.

An RRC_CONNECTED UE may send a sidelink UE information message to the serving cell if it is interested in V2X sidelink communication transmission in order to request sidelink resources.

Carrier aggregation (CA) in sidelink is supported for V2X sidelink communication. It applies to both in coverage UEs and out of coverage UEs. For CA in sidelink, neither primary component carrier (PCC) nor secondary component carriers (SCCs) are defined. Each resource pool (pre)configured for V2X sidelink communication transmission or reception is associated to a single carrier. When a UE supporting CA in sidelink uses Mode 4, it performs carrier selection and may select one or more carriers used for V2X sidelink communication transmission. The carrier selection is performed at MAC layer, depending on the CBR of the (pre)configured carriers for V2X sidelink communication and the PPPP(s) of the V2X messages to be transmitted. The carrier reselection may be performed when resource reselection is triggered and is triggered for each sidelink process. In order to avoid frequent switching across different carriers, the UE may keep using a carrier already selected for transmission, if the measured CBR on this carrier is lower than a (pre)configured threshold. For a UE using Mode 4, logical channel prioritization is performed for a sidelink resource on a carrier depending on the CBR measured on the carrier and the PPPP of the sidelink logical channels.

Sidelink packet duplication is supported for V2X sidelink communication and is performed at PDCP layer of the UE. For sidelink packet duplication for transmission, a PDCP PDU is duplicated at the PDCP entity. The duplicated PDCP PDUs of the same PDCP entity are submitted to two different RLC entities and associated to two different sidelink logical channels respectively. The duplicated PDCP PDUs of the same PDCP entity are only allowed to be transmitted on different sidelink carriers. A UE can activate or deactivate sidelink packet duplication based on (pre) configuration. The PPPR value(s) for which sidelink packet duplication is supported can be (pre)configured via a PPPR threshold. For Mode 4 and Mode 3, the UE shall perform sidelink packet duplication for the data with the configured PPPR value(s) until packet duplication is de-configured for these PPPR value(s). For Mode 3, the UE reports the amount of data associated with one or more PPPR values, and the destination(s) to which the data belongs via sidelink BSR(s). A mapping of PPPR values to logical channel groups can be configured by the BS, and the PPPR value(s) are reflected by the associated logical channel group ID included in the sidelink BSR(s). A list of PPPR value(s) may be reported in Sidelink UE information by an RRC_CONNECTED UE.

For a UE using Mode 3, two non-overlapped sets of carriers are configured by the BS per destination reported by the UE to the network, and they apply to all the PPPR(s) that are configured for sidelink packet duplication. The UE then associates two duplicated sidelink logical channels corresponding to the same PDCP entity respectively with the two sets of carriers configured for the destination of the two sidelink logical channels. The association between the duplicated sidelink logical channel and the carrier set is up to UE implementation. Data of a duplicated sidelink logical channel can only be transmitted on the carrier(s) in the associated carrier set.

For V2X sidelink communication reception, packet duplication detection is performed at PDCP layer of the UE. Reordering function is also supported at PDCP layer and how to set the reordering timer at the PDCP layer is up to UE implementation. There are specific logical channel identities which apply to the sidelink logical channel used for sidelink packet duplication exclusively.

Hereinafter, Packet Data Convergence Protocol (PDCP) duplication will be described. It may be referred to as Section 5.11 of 3GPP TS 38.323 V15.4.0 (2018-12).

Activation/Deactivation of PDCP duplication will be described.

For the PDCP entity configured with pdcp-Duplication, the transmitting PDCP entity shall:
  for SRBs:
  activate the PDCP duplication;
  for DRBs:
  if the activation of PDCP duplication is indicated:
  activate the PDCP duplication;
  if the deactivation of PDCP duplication is indicated:
  deactivate the PDCP duplication.

Duplicate PDU discard will be disclosed.

For the PDCP entity configured with pdcp-Duplication, the transmitting PDCP entity shall:
  if the successful delivery of a PDCP Data PDU is confirmed by one of the two associated AM RLC entities:
  indicate to the other AM RLC entity to discard the duplicated PDCP Data PDU;
  if the deactivation of PDCP duplication is indicated:
  indicate to the secondary RLC entity to discard all duplicated PDCP Data PDUs.

Hereinafter, Channel busy ratio (CBR) and Channel occupancy ratio (CR) will be described. It may be referred to as Sections 5.1.30 and 5.1.3 of 3GPP TS 36.214 V15.3.0 (2018-09).

Channel busy ratio (CBR) measured in subframe n is defined as follows:
  For PSSCH, the portion of sub-channels in the resource pool whose S-RSSI measured by the UE exceed a (pre-)configured threshold sensed over subframes [n−100, n−1];
  For PSCCH, in a pool (pre)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n−100, n−1], assuming that the PSCCH pool is composed of resources with a size of two consecutive PRB pairs in the frequency domain.

Channel occupancy ratio (CR) evaluated at subframe n is defined as the total number of sub-channels used for its transmissions in subframes [n−a, n−1] and granted in subframes [n, n+b] divided by the total number of configured sub-channels in the transmission pool over [n−a, n+b].

For example, a is a positive integer and b is 0 or a positive integer; a and b are determined by UE implementation with a+b+1=1000, a>=500, and n+b should not exceed the last transmission opportunity of the grant for the current transmission.

For example, CR is evaluated for each (re)transmission.

For example, in evaluating CR, the UE shall assume the transmission parameter used at subframe n is reused according to the existing grant(s) in subframes [n+1, n+b] without packet dropping.

For example, the subframe index is based on physical subframe index.

For example, CR can be computed per priority level.

NR standalone operation on unlicensed bands is described. NR standalone operation on unlicensed bands is now studied.

Carrier aggregation with at least one secondary cell (SCell) operating in the unlicensed spectrum is referred to as licensed-assisted access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells.

LAA eNB and UE apply listen-before-talk (LBT) before performing a transmission on LAA SCell. When LBT is applied, the transmitter listens to/senses the channel to determine whether the channel is free or busy. If the channel is determined to be free, the transmitter may perform the transmission. Otherwise, it does not perform the transmission. If an LAA eNB uses channel access signals of other technologies for the purpose of LAA channel access, it shall continue to meet the LAA maximum energy detection threshold requirement.

In LTE LAA, a cell on an unlicensed bands is not considered as primary cell (PCell), but only as secondary cell (SCell). On the other hand, In NR standalone operation on unlicensed bands, a cell on an unlicensed bands can be considered as a PCell.

Meanwhile, for NR-U, UE may be configured with Dual Connectivity. UE may be configured with Master Cell Group (MCG) on licensed carriers while configured with Secondary Cell Group (SCG) on unlicensed carriers. Otherwise, UE may be configured with MCG on unlicensed carriers while configured with SCG on unlicensed carriers. UE, supporting such dual connectivity with NR-U, may be configured with a split bearer in which packet duplication may be activated. In this case, transmissions of duplicated packets on unlicensed carriers would increase channel occupancy.

UEs, supporting sidelink communication, could perform sidelink transmission and reception. For V2X sidelink duplication, if ProSe per-packet reliability (PPPR) above a threshold is configured, UE may activate packet duplication for the packet. However, if congestion occurs, packet duplication will increase congestion because UE will double the amount of resources used for packet transmission.

Therefore, studies for handling packet duplication based on congestion level of frequency in a wireless communication system will be required.

Hereinafter, a method and apparatus for handling packet duplication based on congestion level of frequency in a wireless communication system, according to some embodiments of the present disclosure, will be described with reference to following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred as a user equipment (UE).

Figure 7:
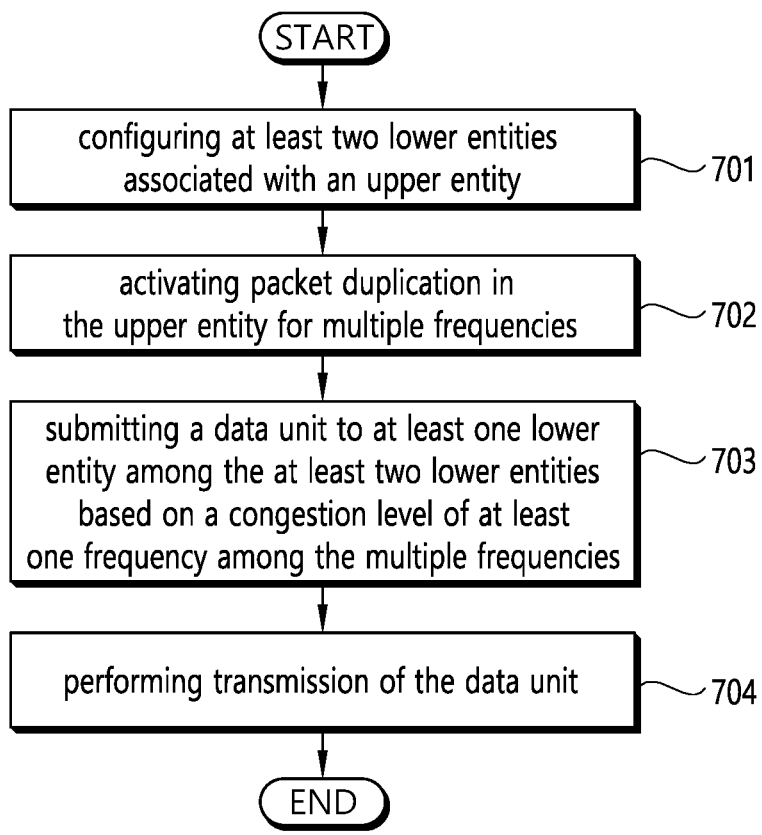
FIG. 7 shows an example of a method for handling packet duplication based on congestion level of frequency in a wireless communication system, according to some embodiments of the present disclosure.

FIG. 7 shows an example of a method for handling packet duplication based on congestion level of frequency in a wireless communication system, according to some embodiments of the present disclosure. More specifically, FIG. 7 shows an example of an embodiment of the present disclosure on perspective of a wireless device.

In step 701, a wireless device may configure at least two lower entities associated with an upper entity.

For example, the lower entity may be a RLC entity. The upper entity may be a PDCP entity. In this case, a wireless device may configure at least two RLC entities associated with a PDCP entity.

In step 702, a wireless device may activate packet duplication in the upper entity for multiple frequencies.

For example, the upper entity of the wireless device may duplicate a data unit for multiple frequencies. The upper entity may duplicate a data unit for the at least two lower entities associated with the upper entity.

According to some embodiments of the present disclosure, a wireless device may activate or deactivate the packet duplication based on a ProSe per-packet reliability (PPPR). For example, for V2X sidelink duplication, if PPPR above a threshold is configured, the wireless device may activates packet duplication for the packet.

In step 703, a wireless device may submit a data unit to at least one lower entity among the at least two lower entities based on a congestion level of at least one frequency among the multiple frequencies.

According to some embodiments of the present disclosure, the congestion level may include channel busy ratio (CBR) and/or received signal strength indicator (RSSI) measurement.

For example, a wireless device may submit the data unit to a specific lower entity among the at least two lower entities based on that the congestion level of a specific frequency among the multiple frequencies is lower than a threshold. The specific frequency may be mapped to the specific lower entity. That is, the data unit submitted to the specific lower entity may be transmitted from the wireless device, in step 704.

For other example, a wireless device may not submit the data unit to a specific lower entity among the at least two lower entities based on that the congestion level of a specific frequency among the multiple frequencies is above a threshold. The specific frequency may be mapped to the specific lower entity. That is, transmission of the data unit using the specific lower entity may not be performed.

In this example, the threshold may be indicated by a network or configured by a wireless device by itself. The CBR may be measured by the wireless device or indicated by a network. The RSSI measurement may be measured by a wireless device or indicated by a network.

According to some embodiments of the present disclosure, the congestion level may be based on LBT failures. For example, some frequencies among the multiple frequencies may be unlicensed frequencies.

For example, a wireless device may submit the data unit to a specific lower entity among the at least two lower entities based on that the LBT failures of a specific frequency among the multiple frequencies does not become up to N times at an interval. The specific frequency may be mapped to the specific lower entity. That is, the data unit submitted to the specific lower entity may be transmitted from the wireless device, in step 704.

For other example, a wireless device may not submit the data unit to a specific lower entity among the at least two lower entities based on that the LBT failures of a specific frequency among the multiple frequencies becomes up to N times at an interval. The specific frequency may mapped to the specific lower entity. That is, transmission of the data unit using the specific lower entity may not be performed.

In this example, the threshold number 'N' and the interval time may be indicated by a network or configured by a wireless device by itself. The LBT failures may be counted by the wireless device.

According to some embodiments of the present disclosure, a wireless device may configure a primary entity and at least one secondary entity as the at least two lower entities associated with an upper entity.

For example, the wireless device may submit a data unit to the primary entity. The wireless device may determine to submit a data unit or a duplicated data unit to the at least one secondary entity based on a congestion level of at least one frequency among multiple entities mapped to the at least one secondary entities. In other words, one lower entity may be a primary entity and the other lower entities among the at least two lower entities may be secondary entities.

For example, a wireless device may submit a data unit to at least one of the secondary entities. For example, a wireless device may submit a data unit (or a duplicated data unit) to a primary entity and at least one of the secondary entities. That is, a data unit may be submitted to at least two lower entities including one primary entity and one secondary entity.

For example, a wireless device may submit a data unit only to the primary entity based on the congestion level. In other words, the data unit may be submitted to none of the secondary entities because of the congestion level. In this case, a wireless device may deactivate the packet duplication in the upper entity for multiple frequencies. For example, the primary entity may be mapped to a licensed frequency.

According to some embodiments of the present disclosure, a wireless device may configure a dual connection with a network.

For example, a wireless device may configure connection with a master node (MN) of a network on a first frequency among the multiple frequencies and connection with a secondary node (SN) of the network on a second frequency and a third frequency among the multiple frequencies. The at least two lower entities may include a first lower entity, a second lower entity, and a third lower entity which are mapped to the first frequency, the second frequency, and the third frequency, respectively.

For example, a wireless device may submit the data unit to the first lower entity and the second lower entity. A wireless device may not submit the data unit to the third lower entity. Since, the congestion level of the first and second frequency is below a threshold and the congestion level of the third frequency is above a threshold.

According to some embodiments of the present disclosure, a wireless device may configure a carrier aggregation with another wireless device.

For example, a wireless device may configure connection with the other wireless device via a first frequency and a second frequency. The at least two lower entities may include a first lower entity and a second lower entity which are mapped to the first frequency and the second frequency, respectively.

For example, a wireless device may submit the data unit to the first lower entity and the second lower entity.

For other example, a wireless device may submit the data unit to one of the first lower entity and the second lower entity based on the congestion level of the first frequency and the second frequency.

In step 704, a wireless device may perform transmission of the data unit. For example, a wireless device may transmit the data unit submitted to the at least one lower entity among the at least two lower entities.

For example, a wireless device may perform uplink and/or sidelink transmission. A wireless device may perform an uplink transmission with a network. A wireless device may perform a sidelink transmission with another wireless device.

According to some embodiments of the present disclosure, a wireless device may be in communication with at least one of a user equipment, a network, or an autonomous vehicle other than the wireless device.

Hereinafter, a method for handling packet duplication based on congestion level of frequency in a wireless communication system, according to some embodiments of the present disclosure, will be described. The method may include the following steps.

UE may activate packet duplication for the PDCP entity associated with more than two associated RLC entities.

For example, the RLC entities may be associated with different Cell Groups, different carrier frequencies or different cells. Namely, each RLC entity of a logical channel may be associated with each cell group, each carrier or each cell.

For example, if PPPR is above a threshold, the associated PDCP entity may be configured for packet duplication for sidelink.

For example, if a base station configures and indicates duplication, a radio bearer related to the associated PDCP entity may be configured for packet duplication. In addition packet duplication may be activated in the UE side for uplink or sidelink.

If configured by the network, UE may measure channel occupancy on at least one frequency (or one cell) mapped to at least one logical channel of a RLC entity among the associated RLC entities.

For example, the frequency (or the cell) to be measured for this purpose may be indicated by the network or pre-configured by configuration stored in the UE.

For example, if a frequency or (a cell) is not indicated for this measurement by the network or pre-configured by configuration stored in the UE, UE may consider that the frequency (or the cell) has the lowest level of channel occupancy on the frequency (e.g. zero level, totally idle in channel occupancy).

For example, the channel occupancy may be either CBR (i.e. Channel Busy Ratio for SL) or RSSI measurement (Carrier Received Signal Strength Indicator for NR-U).

For example, the network may indicate a level of channel occupancy for a frequency (or a cell) to the UE, instead of configuring this measurement.

If a level of the measured channel occupancy or the channel occupancy indicated by the network is above or equal to a threshold for the frequency (or the cell), UE may submit the PDCP PDU only to the primary RLC entity and/or the RLC entity that are/is not mapped to the measured frequency or the indicated frequency among the frequencies of the carriers (or the cells) mapped to all the associated RLC entities. If UE should submit the PDCP PDU only to a single RLC entity due to channel occupancy, UE deactivates packet duplication.

For example, if UE could submit the PDCP PDU to more than two RLC entities, UE may choose two or all RLC entities of them to submit the PDCP PDU.

For example, if UE has no RLC entities to submit the PDCP PDU due to channel occupancy, UE submits the PDCP PDU only to the primary RLC entity or a RLC entity mapped to a licensed carrier regardless of channel occupancy.

For other example, alternatively, if LBT fails up to N times at an interval indicated by the network, UE may submit the PDCP PDU to the primary RLC entity and/or the RLC entity that are/is not mapped to the measured frequency or the indicated frequency among the frequencies of the carriers (or the cells) mapped to all the associated RLC entities. If UE should submit the PDCP PDU only to a single RLC entity due to channel occupancy, UE may deactivate packet duplication. If UE has no RLC entities to submit the PDCP PDU due to LBT, UE may submit the PDCP PDU only to the primary RLC entity or a RLC entity mapped to a licensed carrier regardless of LBT.

UE may discard duplicated packets for the associated RLC entity mapped to the frequency (or the cell) for which a level of the measured channel occupancy or the channel occupancy indicated by the network is above a threshold (except the primary RLC entity).

For example, UE may stop transmissions of duplicated packets on the frequency (or the cell) for which a level of the measured channel occupancy or the channel occupancy indicated by the network is above a threshold.

If packet duplication is deactivated, UE may indicate to the network that packet duplication is deactivated for the radio bearer related to the PDCP entity If the measured channel occupancy or the channel occupancy provided by the network is below a threshold for the frequency (or the cell), UE may submit the PDCP PDU to the RLC entity.

If packet duplication has been deactivated in the PDCP entity and there are more than one RLC entity to submit the PDCP PDU, UE may activate packet duplication for the PDCP entity.

Figure 8A:
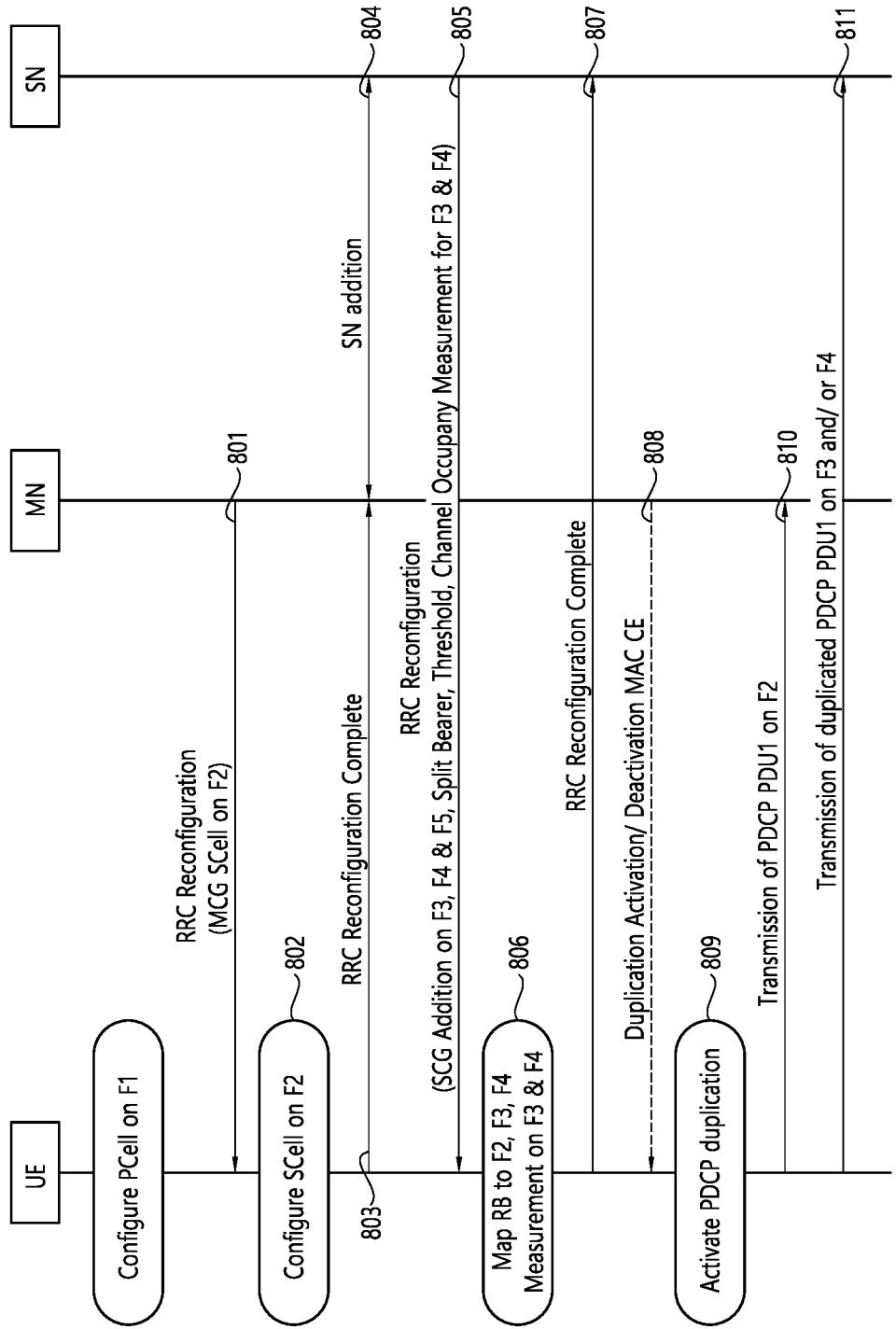
FIGS. 8A and 8B show an example of a method for handling packet duplication based on congestion level of frequency in a wireless communication system, according to some embodiments of the present disclosure.
Figure 8B:
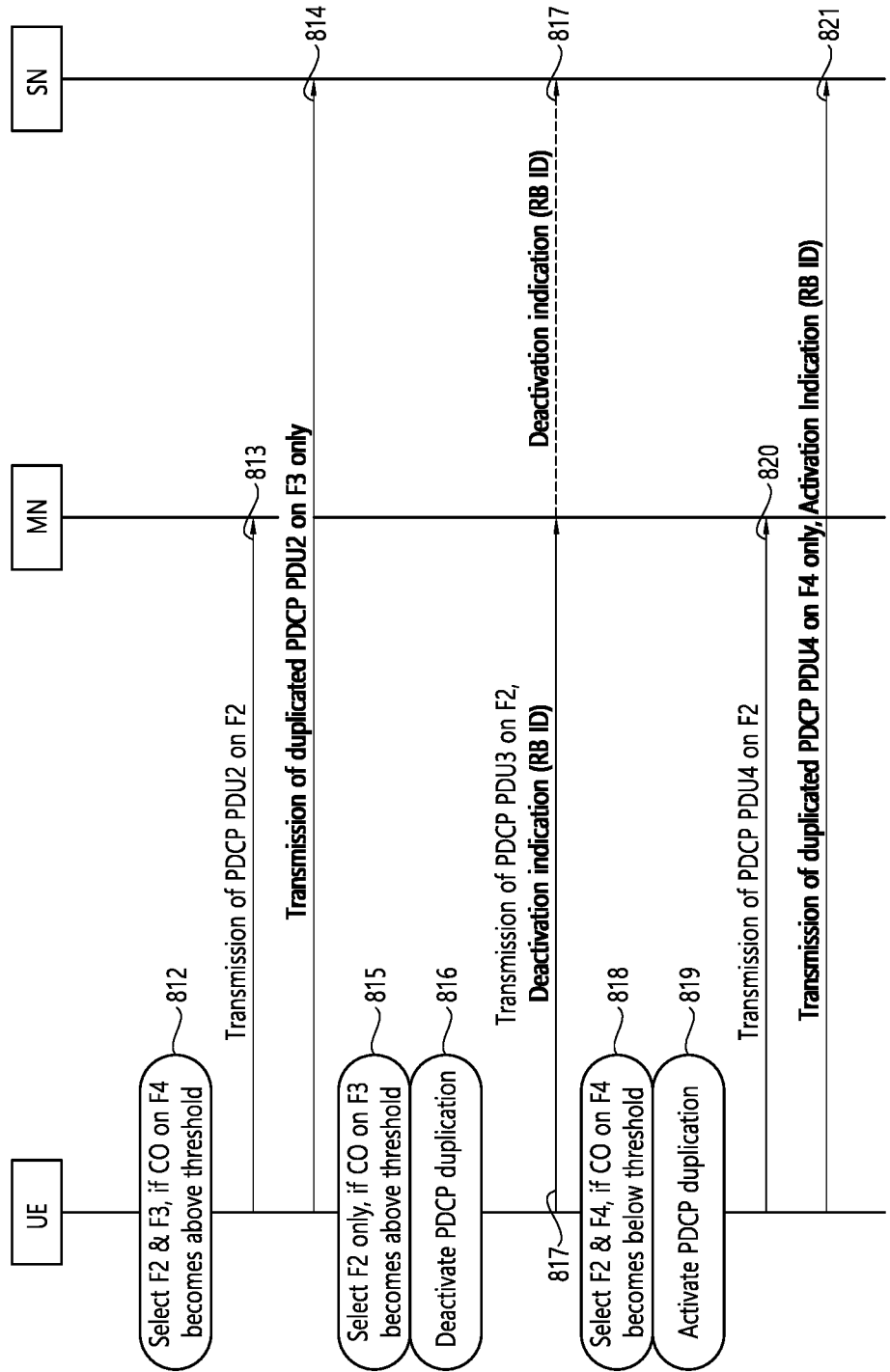

FIGS. 8A and 8B show an example of a method for handling packet duplication based on congestion level of frequency in a wireless communication system, according to some embodiments of the present disclosure. More specifically, in FIGS. 8A and 8B, a wireless device (for example, a UE) may handle packet duplication for dual connectivity with a network. The wireless device may be connected to the network via a master node (MN) and a secondary node (SN) to perform uplink transmission.

In step 801, Master Node (MN) (for example, Master gNB or Master eNB) may transmit a RRC Reconfiguration message to configure SCell on F2 (Frequency 2) for a UE. The UE may receive RRC Reconfiguration message from PCell on F1 (Frequency 1).

In step 802, the UE may configure SCell on F2 for Master Cell Group (MCG) according to the received RRC Reconfiguration message.

In step 803, the UE may transmit, to the MN, a RRC Reconfiguration Complete message for the SCell on F2.

In step 804, MN may determine addition of a Secondary Node (SN) for the UE.

In step 805, SN may provide MN with SCG configuration to add SCG cells on F3, F4 and F5. Then, MN sends a RRC Reconfiguration message to UE to add the SCG cells, split bearers with duplication and a threshold, and channel occupancy measurements on F3 and F4.

In step 806, upon receiving the RRC configuration message, UE may configure the split bearers by mapping them to F2, F3 and F4 and configure channel occupancy measurements on F3 and F4.

In step 807, UE may transmit a RRC Reconfiguration Complete message to SN.

In step 808, UE may receive a Duplication Activation or Deactivation MAC Control Element from the network. According to some embodiments of the present disclosure, step 808 may be performed optionally.

In step 809, UE may configure at least one PDCP entity for a split bearer. For example, UE may activate packet duplication for the PDCP entity associated with more than two associated RLC entities, upon receiving activation command via the Duplication Activation/Deactivation MAC Control Element from the network.

UE may activate packet duplication and submit a duplicated PDCP PDU to the RLC entities of logical channels mapped to F2, F3 and F4. Hence, the PDCP PDU may be transmitted onto F2, F3 and F4 with duplication. For example, in steps 810 and 811, UE may perform transmission of PDCP PDU1 on F2 and transmission of duplicated PDCP PDU1 on F3 and/or F4.

According to some embodiments of the present disclosure, for uplink, the split bearer may be configured for different Cell Groups. For example, the split bearer may be configured in both MCG and SCG. For example, the split bearer may be configured in different cells, for example, in PCell (or PSCell) and SCell.

According to some embodiments of the present disclosure, the RLC entities may be associated with different Cell Groups, different carrier frequencies or different cells. Namely, each RLC entity of a logical channel may be associated with each cell group, each carrier or each cell.

According to some embodiments of the present disclosure, if a base station configures and indicates duplication, a radio bearer related to the associated PDCP entity may be configured for packet duplication. In addition, packet duplication may be activated in the UE side for uplink.

If configured by the network, UE may measure channel occupancy on at least one frequency (or one cell) mapped to at least one logical channel of a RLC entity among the associated RLC entities.

For example, the frequency (or the cell) to be measured for this purpose may be indicated by the network or pre-configured by configuration stored in the UE.

For example, if a frequency or (a cell) is not indicated for this measurement by the network or pre-configured by configuration stored in the UE, UE may consider that the frequency (or the cell) has the lowest level of channel occupancy on the frequency (for example, zero level, totally idle in channel occupancy).

For example, the channel occupancy may be either Channel Busy Ratio (CBR) (for example, CBR for SL) or Received Signal Strength Indicator (RSSI) measurement (for example, Carrier RSSI for NR-U).

For example, the network may indicate a level of channel occupancy for a frequency (or a cell) to the UE, instead of configuring this measurement.

UE may select at least one of frequency mapped to at least one logical channel of a RLC entity among the associated RLC entities, based on congestion level of frequency.

If a level of the measured channel occupancy or the channel occupancy indicated by the network is above or equal to a threshold for the frequency (or the cell), UE may submit a PDCP PDU only to the primary RLC entity and/or the RLC entity that are/is not mapped to the measured frequency or the indicated frequency among the frequencies of the carriers (or the cells) mapped to all the associated RLC entities.

For example, in step 812, if the level of channel occupancy measured on F4 is above the threshold, UE may submit a PDCP PDU only to the RLC entities of logical channels mapped to F2 and F3.

In this example, in steps 813 and 814, the UE may perform transmission of PDCP PDU2 on F2 to the MN and transmission of duplicated PDCP PDU2 on F3, only, to the SN.

For other example, in step 815, if the level of channel occupancy measured on F3 as well as F4 is above the threshold, UE may submit a PDCP PDU only to the RLC entity of logical channel mapped to F2.

In this example, in step 816, if UE should submit the PDCP PDU only to a single RLC entity due to channel occupancy, UE may deactivate packet duplication. In step 817, UE may perform transmission of PDCP PDU 3 on F3 to the MN.

According to some embodiments of the present disclosure, if UE can submit the PDCP PDU to more than two RLC entities, UE may choose two or all RLC entities of them to submit the PDCP PDU.

According to some embodiments of the present disclosure, if UE has no RLC entities to submit the PDCP PDU due to channel occupancy, UE may submit the PDCP PDU only to the primary RLC entity or a RLC entity mapped to a licensed carrier regardless of channel occupancy.

Alternatively, if LBT fails up to N times at an interval indicated by the network, UE may submit the PDCP PDU to the primary RLC entity and/or the RLC entity that are/is not mapped to the measured frequency or the indicated frequency among the frequencies of the carriers (or the cells) mapped to all the associated RLC entities. If UE should submit the PDCP PDU only to a single RLC entity due to channel occupancy, UE may deactivate packet duplication. If UE has no RLC entities to submit the PDCP PDU due to LBT, UE may submit the PDCP PDU only to the primary RLC entity or a RLC entity mapped to a licensed carrier regardless of LBT.

UE may discard duplicated packets for the associated RLC entity mapped to the frequency (or the cell) for which a level of the measured channel occupancy or the channel occupancy indicated by the network is above a threshold (except the primary RLC entity).

In addition, UE may stop transmissions of duplicated packets on the frequency (or the cell) for which a level of the measured channel occupancy or the channel occupancy indicated by the network is above a threshold.

In step 817, if packet duplication is deactivated, UE may indicate to the network that packet duplication is deactivated for the radio bearer related to the PDCP entity.

For uplink, UE may indicate to the network on which radio bearer the packet duplication is or has been deactivated. For example, the UE may indicate a RB ID corresponding to the radio bearer. This indication may be carried to MN or SN. If MN receives this indication, MN may forward the indication to SN.

If the measured channel occupancy or the channel occupancy provided by the network is below a threshold for the frequency (or the cell), UE may submit a PDCP PDU to the RLC entity of a logical channel. If packet duplication has been deactivated in the PDCP entity and there are more than one RLC entity to submit the PDCP PDU, UE may activate packet duplication for the PDCP entity.

For example, in steps 818 and 819, if the measured channel occupancy or the channel occupancy provided by the network is below a threshold for F4, UE may activate packet duplication for a PDCP PDU and submits the PDCP PDU to the RLC entity of a logical channel mapped to F4. UE may also submit the duplicated PDCP PDU to the RLC entity of a logical channel mapped to F2. For example, in steps 820 and 821, UE may perform transmission of PDCP PDU4 on F2 and transmissions of duplicated PDCP PDU4 on F3.

In step 821, for uplink, UE may also indicate to the network that packet duplication is or has been activated for the radio bearer related to the PDCP entity. For example, UE may transmit Active Indication indicating a RB ID corresponding to the radio bearer to the SN.

Figure 9A:
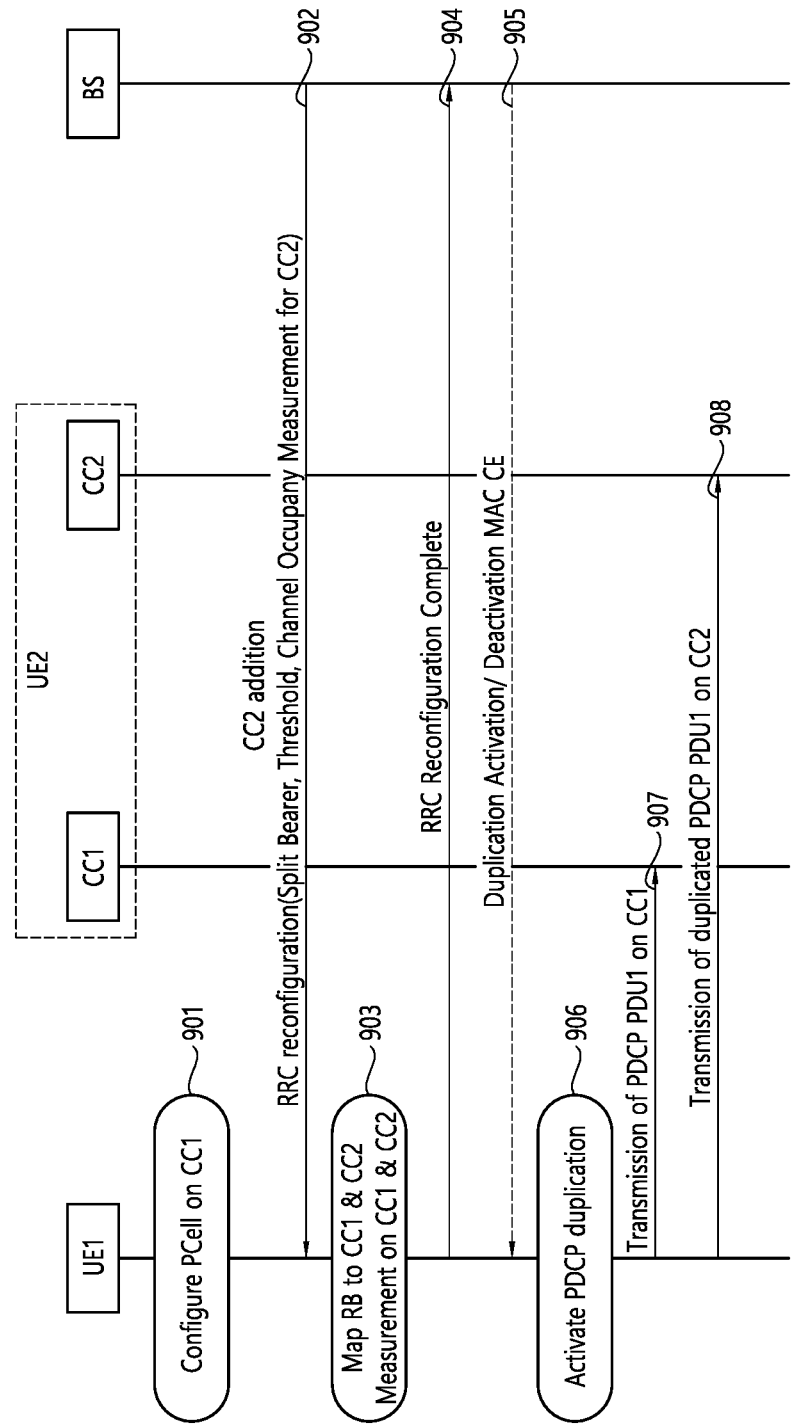
FIGS. 9A and 9B show an example of a method for handling packet duplication based on congestion level of frequency in a wireless communication system, according to some embodiments of the present disclosure.
Figure 9B:
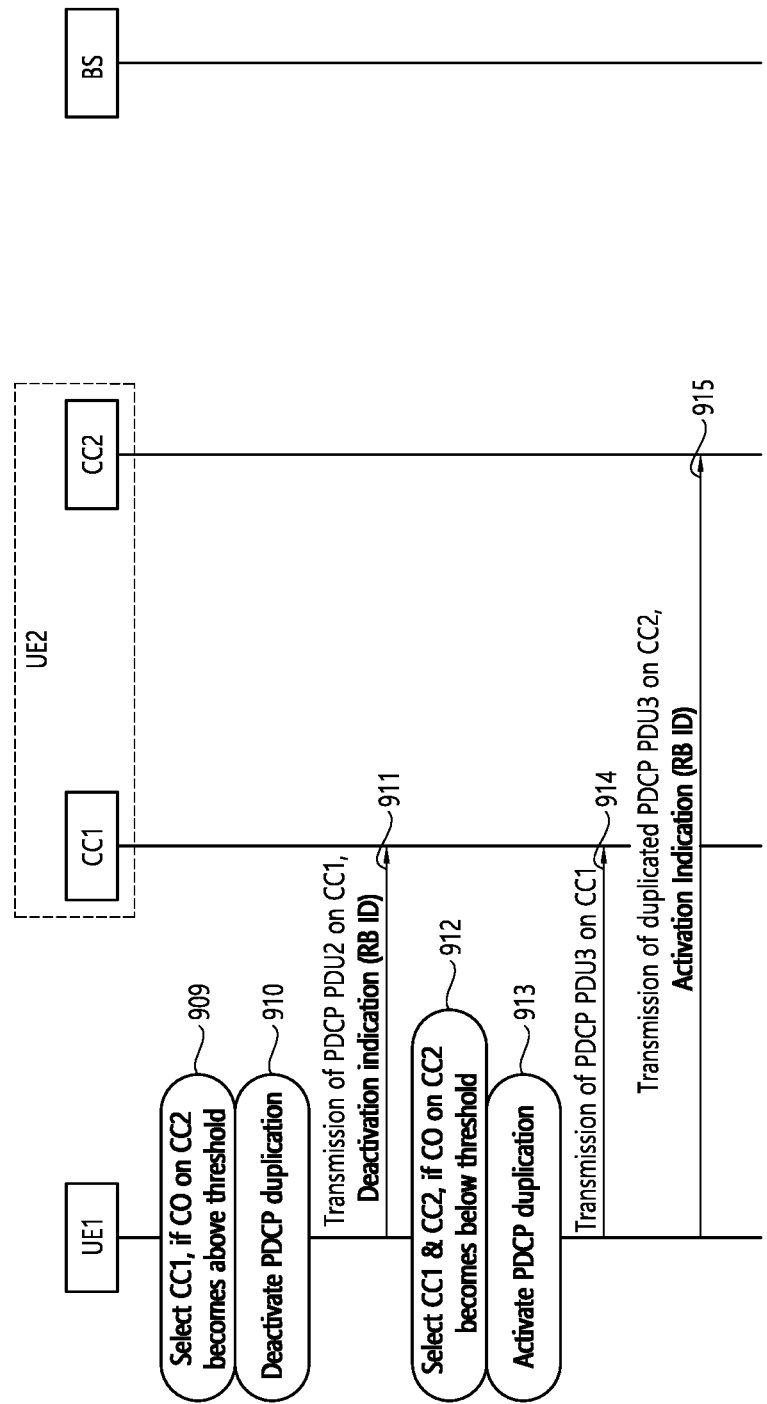

FIGS. 9A and 9B show an example of a method for handling packet duplication based on congestion level of frequency in a wireless communication system, according to some embodiments of the present disclosure. More specifically, in FIGS. 9A and 9B, a wireless device (for example, UE1) may handle packet duplication for carrier aggregation with other wireless device (for example, UE2). The wireless device may be connected to the other wireless device via a component carrier 1 (CC1) and a component carrier 2 (CC2) to perform sidelink transmission.

FIGS. 9A and 9B show only two carrier components, however, the present disclosure is not limited thereto. For example, there could be more than two carrier components for carrier aggregation between UE1 and UE2.

The description of the same or similar features described above could be omitted or simplified, for convenience of explanation.

In step 901, UE1 may configure a RRC connection with UE2 via CC1. For example, UE1 may configure PCell on CC1.

In step 902, a network (for example, a base station (BS)) may determine to perform carrier aggregation. For example, BS may transmit, to UE1 and UE2, a RRC Reconfiguration message for CC2. The RRC Reconfiguration message may include configurations for split bearers, a threshold, and channel occupancy measurements on CC1 and CC2.

In step 903, upon receiving the RRC configuration message, UE1 may configure the split bearers by mapping them to CC1 and CC2, and configure channel occupancy measurements on CC1 and CC2.

In step 904, UE1 may transmit, to BS, a RRC Reconfiguration Complete message.

In step 905, UE1 may receive a Duplication Activation or Deactivation MAC Control Element (MAC CE) from BS. According to some embodiments of the present disclosure, step 905 may be performed optionally.

In step 906, UE may configure at least one PDCP entity for a split bearer. For example, UE may activate packet duplication for the PDCP entity associated with more than two associated RLC entities, upon receiving activation command via the Duplication Activation/Deactivation MAC Control Element from the network.

UE1 may activate packet duplication and submit a duplicated PDCP PDU to the RLC entities of logical channels mapped to CC1 and CC2. Hence, the PDCP PDU may be transmitted onto CC1 and CC2 with duplication. For example, in steps 907 and 908, UE1 may perform transmission of PDCP PDU1 on CC1 and transmission of duplicated PDCP PDU1 on CC2.

According to some embodiments of the present disclosure, for sidelink, the split bearer may be configured for different carriers and different RATs (e.g. LTE and NR sidelink). If PPPR is above a threshold, the associated PDCP entity may be configured and/or activated for packet duplication for sidelink.

According to some embodiments of the present disclosure, the RLC entities may be associated with different Cell Groups, different carrier frequencies or different cells.

Namely, each RLC entity of a logical channel may be associated with each cell group, each carrier or each cell.

According to some embodiments of the present disclosure, if a base station configures and indicates duplication, a radio bearer related to the associated PDCP entity may be configured for packet duplication. In addition, packet duplication may be activated in the UE1 side for sidelink.

If configured by the network, UE1 and/or UE2 may measure channel occupancy on at least one carrier component among the CC1 and CC2. For example, the carrier component to be measured may be indicated by the network. For example, the carrier component to be measured may be pre-configured by configuration and stored in the UE1 and/or UE2.

For example, if a carrier component is not indicated for this measurement by the network or pre-configured by configuration stored in the UE1, UE1 may consider that the carrier component has the lowest level of channel occupancy on the frequency (for example, zero level, totally idle in channel occupancy).

For example, the channel occupancy may be either Channel Busy Ratio (CBR) (for example, CBR for SL) or Received Signal Strength Indicator (RSSI) measurement (for example, Carrier RSSI for NR-U).

For example, the network may indicate a level of channel occupancy for a carrier component to the UE1 and/or UE2, instead of configuring this measurement.

UE1 and/or UE2 may select at least one of carrier component mapped to at least one logical channel of a RLC entity among the associated RLC entities, based on congestion level of frequency.

For example, in step 909, if the level of channel occupancy measured on CC2 is above a threshold, UE1 may submit a PDCP PDU only to the RLC entity of logical channel mapped to CC1.

In this example, in step 910, if UE1 should submit the PDCP PDU only to a single RLC entity, UE1 may deactivate packet duplication. In step 911, UE1 may perform transmission of PDCP PDU2 to the UE2 via CC1.

Alternatively, if LBT fails up to N times at an interval on a carrier component, UE1 may not submit the PDCP PDU to the RLC entity that is mapped to the carrier component. If UE1 should submit the PDCP PDU only to a single RLC entity due to the LBT, UE1 may deactivate packet duplication.

According to some embodiment of the present disclosure, UE1 may discard duplicated packets for the associated RLC entity mapped to the carrier component for which a level of the measured channel occupancy is above a threshold. In addition, UE1 may stop transmissions of duplicated packets on the carrier component.

In step 911, if packet duplication is deactivated, UE1 may indicate to UE2 that packet duplication is deactivated for the radio bearer related to the PDCP entity.

For sidelink, UE1 may indicate to the UE2 which radio bearer the packet duplication is or has been deactivated. For example, UE1 may transmit a Deactivation Indication for indicating a RB ID or a Destination ID corresponding to the radio bearer.

If the measured channel occupancy or the channel occupancy provided by the network is below a threshold for the carrier component, UE1 may submit a PDCP PDU to the RLC entity of a logical channel mapped to the carrier component. If packet duplication has been deactivated in the PDCP entity and there are more than one RLC entity to submit the PDCP PDU, UE1 may activate packet duplication for the PDCP entity.

For example, in steps 912 and 913, if the measured channel occupancy or the channel occupancy provided by the network is below a threshold for CC2, UE1 may activate packet duplication for a PDCP PDU and submits the PDCP PDU to the RLC entity of a logical channel mapped to CC2. UE1 may also submit the duplicated PDCP PDU to the RLC entity of a logical channel mapped to CC1. In steps 914 and 915, UE may perform transmission of PDCP PDU3 on CC1 and transmissions of duplicated PDCP PDU3 on CC2.

In step 915, for sidelink, UE1 may indicate to UE2 which radio bearer the packet duplication is or has been activated. For example, UE1 may transmit Active Indication indicating a RB ID or a Destination ID corresponding to the radio bearer.

According to some embodiments of the present disclosure described with reference to FIGS. 7 to 9, a wireless device could handle packet duplication depending on measurement results.

For example, a wireless device, which is configured with a split bearer, could activate or deactivate packet duplication based on congestion level to provide proper control of congestion.

For example, a wireless device may deactivate packet duplication, when congestion level becomes high on a carrier where the duplicated packets are transmitted.

In addition, according to some embodiments of the present disclosure, a wireless device could provide a dynamic control of activation or deactivation of packet duplication based on congestion level.

Therefore, it could be prevented to increase the congestion level of a certain resource by packet duplication.

Figure 10:
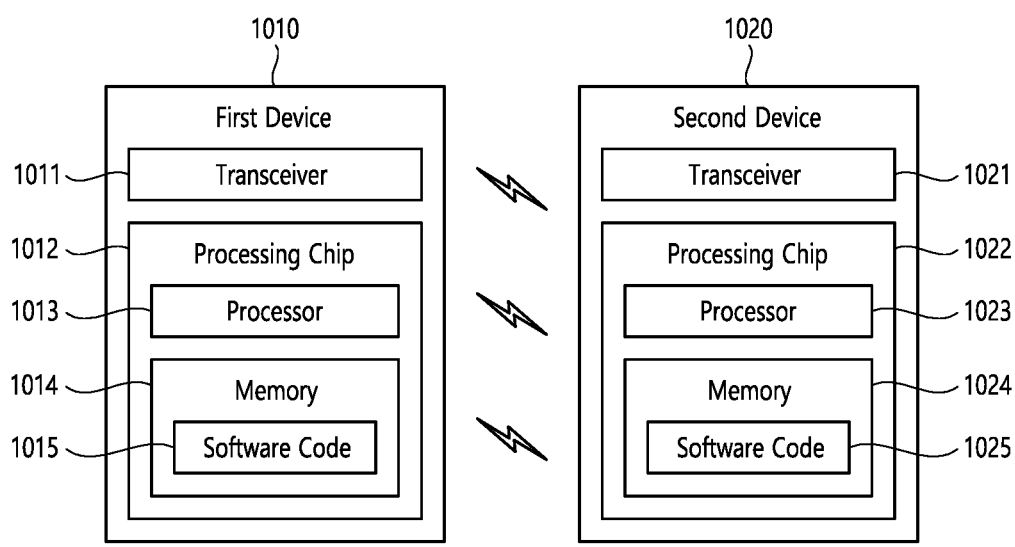
FIG. 10 shows another example of a wireless communication system to which the technical features of the present disclosure can be applied.

FIG. 10 shows another example of a wireless communication system to which the technical features of the present disclosure can be applied.

Referring to FIG. 10, the wireless communication system may include a first device 1010 and a second device 1020.

The first device 1010 may include at least one transceiver, such as a transceiver 1011, and at least one processing chip, such as a processing chip 1012. The processing chip 1012 may include at least one processor, such a processor 1013, and at least one memory, such as a memory 1014. The memory may be operably connectable to the processor 1013. The memory 1014 may store various types of information and/or instructions. The memory 1014 may store a software code 1015 which implements instructions that, when executed by the processor 1013, perform operations of the present disclosure described below. For example, the software code 1015 may implement instructions that, when executed by the processor 1013, perform the functions, procedures, and/or methods of the present disclosure described below. For example, the software code 1015 may control the processor 1013 to perform one or more protocols. For example, the software code 1015 may control the processor 1013 may perform one or more layers of the radio interface protocol.

The second device 1020 may include at least one transceiver, such as a transceiver 1021, and at least one processing chip, such as a processing chip 1022. The processing chip 1022 may include at least one processor, such a processor 1023, and at least one memory, such as a memory 1024. The memory may be operably connectable to the processor 1023. The memory 1024 may store various types of information and/or instructions. The memory 1024 may store a software code 1025 which implements instructions that, when executed by the processor 1023, perform operations of the present disclosure described below. For example, the software code 1025 may implement instructions that, when executed by the processor 1023, perform the functions, procedures, and/or methods of the present disclosure described below. For example, the software code 1025 may control the processor 1023 to perform one or more protocols. For example, the software code 1025 may control the processor 1023 may perform one or more layers of the radio interface protocol.

According to some embodiments of the present disclosure, a processor 1013 for a first device 1010 in a wireless communication system is provided. The processor 1013 may be configured to control the first device 1010 to perform operations. The operations may cause the first device 1010 to configure at least two lower entities associated with an upper entity. The operations may cause the first device 1010 to activate packet duplication in the upper entity for multiple frequencies. The operations may cause the first device 1010 to submit a data unit to at least one lower entity among the at least two lower entities based on a congestion level of at least one frequency among the multiple frequencies. The operations may cause the first device 1010 to perform transmission of the data unit.

According to some embodiment of the present disclosure, the technical features of the present disclosure could be embodied directly in hardware, in a software executed by a processor, or in a combination of the two. For example, a method performed by a first core network node in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device. The stored a plurality of instructions may cause the wireless device to configure at least two lower entities associated with an upper entity. The stored a plurality of instructions may cause the wireless device to activate packet duplication in the upper entity for multiple frequencies. The stored a plurality of instructions may cause the wireless device to submit a data unit to at least one lower entity among the at least two lower entities based on a congestion level of at least one frequency among the multiple frequencies. The stored a plurality of instructions may cause the wireless device to perform transmission of the data unit.

Figure 11:
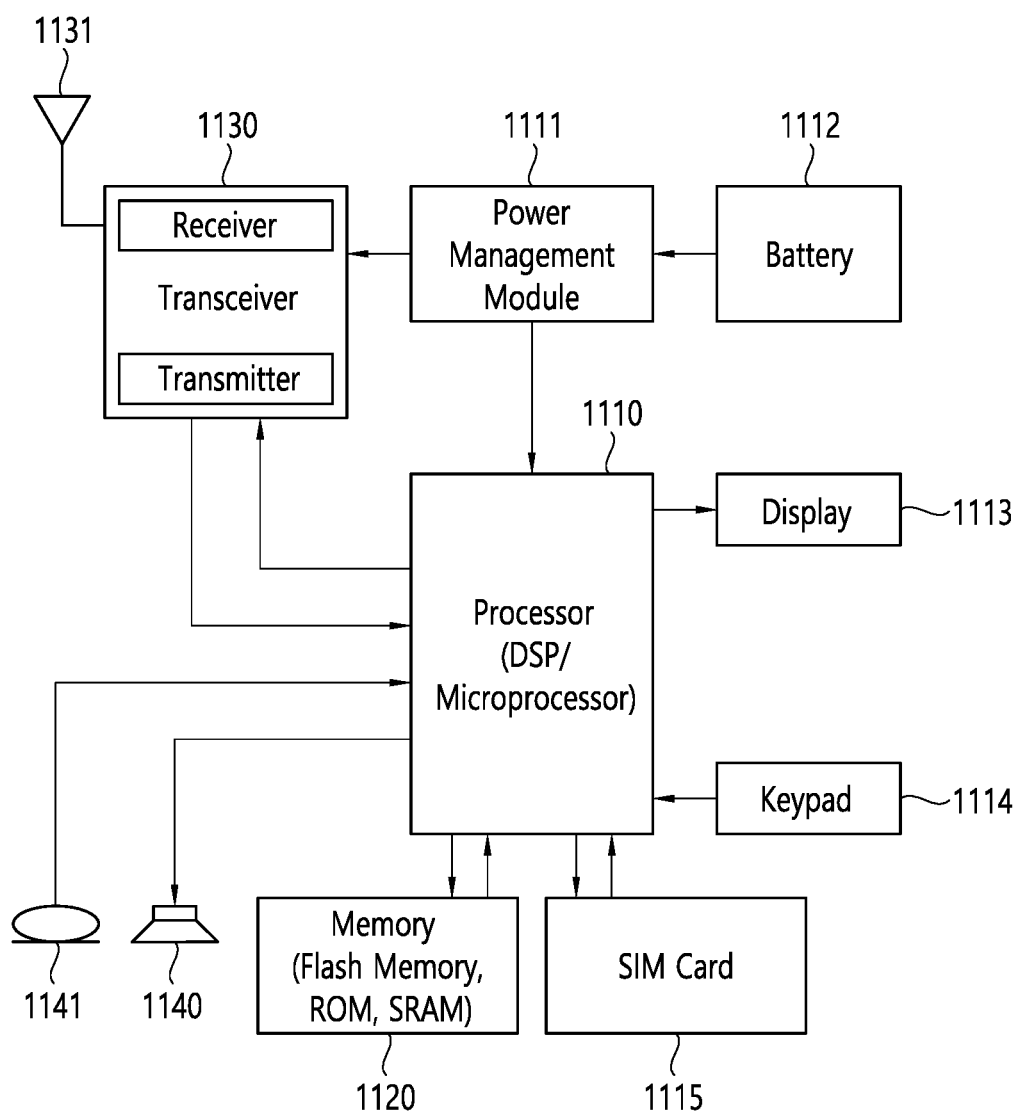
FIG. 11 shows an apparatus to which the technical features of the present disclosure can be applied.

FIG. 11 shows an apparatus to which the technical features of the present disclosure can be applied. The detailed description of the same features as those described above will be simplified or omitted.

An apparatus may be referred to as a wireless device, such as a user equipment (UE), an Integrated Access and Backhaul (IAB), or etc.

A wireless device includes a processor 1110, a power management module 1111, a battery 1112, a display 1113, a keypad 1114, a subscriber identification module (SIM) card 1115, a memory 1120, a transceiver 1130, one or more antennas 1131, a speaker 1140, and a microphone 1141.

The processor 1110 may be configured to implement proposed functions, procedures and/or methods described in this description. Layers of the radio interface protocol may be implemented in the processor 1110. The processor 1110 may include application-specific integrated circuit (ASIC), other chipset, logic circuit and/or data processing device. The processor 1110 may be an application processor (AP). The processor 1110 may include at least one of a digital signal processor (DSP), a central processing unit (CPU), a graphics processing unit (GPU), a modem (modulator and demodulator). An example of the processor 1110 may be found in SNAPDRAGON™™ series of processors made by Qualcomm®, EXYNOSTM™ series of processors made by Samsung®, A series of processors made by Apple®, HELIOTM™ series of processors made by MediaTek®, ATOMTM™ series of processors made by Intel® or a corresponding next generation processor.

The power management module 1111 manages power for the processor 1110 and/or the transceiver 1130. The battery 1112 supplies power to the power management module 1111. The display 1113 outputs results processed by the processor 1110. The keypad 1114 receives inputs to be used by the processor 1110. The keypad 1114 may be shown on the display 1113. The SIM card 1115 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1120 is operatively coupled with the processor 1110 and stores a variety of information to operate the processor 1110. The memory 1120 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1120 and executed by the processor 1110. The memory 1120 can be implemented within the processor 1110 or external to the processor 1110 in which case those can be communicatively coupled to the processor 1110 via various means as is known in the art.

The transceiver 1130 is operatively coupled with the processor 1110, and transmits and/or receives a radio signal. The transceiver 1130 includes a transmitter and a receiver. The transceiver 1130 may include baseband circuitry to process radio frequency signals. The transceiver 1130 controls the one or more antennas 1131 to transmit and/or receive a radio signal.

The speaker 1140 outputs sound-related results processed by the processor 1110. The microphone 1141 receives sound-related inputs to be used by the processor 1110.

According to some embodiments of the present disclosure, the processor 1110 may be configured to be coupled operably with the memory 1120 and the transceiver 1130. The processor 1110 may be configured to leave a connected state with a network. The processor 1110 may be configured to configure at least two lower entities associated with an upper entity. The processor 1110 may be configured to activate packet duplication in the upper entity for multiple frequencies. The processor 1110 may be configured to submit a data unit to at least one lower entity among the at least two lower entities based on a congestion level of at least one frequency among the multiple frequencies. The processor 1110 may be configured to control the transceiver 1130 to perform transmission of the data unit.

According to some embodiments of the present disclosure, the processor 1110 may control a wireless device to handle packet duplication depending on measurement results.

For example, the processor 1110 may configure a wireless device, which is configured with a split bearer, to activate or deactivate packet duplication based on congestion level for providing proper control of congestion.

For example, the processor 1110 may configure a wireless device to deactivate packet duplication, when congestion level becomes high on a carrier where the duplicated packets are transmitted.

In addition, according to some embodiments of the present disclosure, the processor 1110 may configure a wireless device to provide a dynamic control of activation or deactivation of packet duplication based on congestion level.

Therefore, it could be prevented to increase the congestion level of a certain resource by packet duplication.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 12:
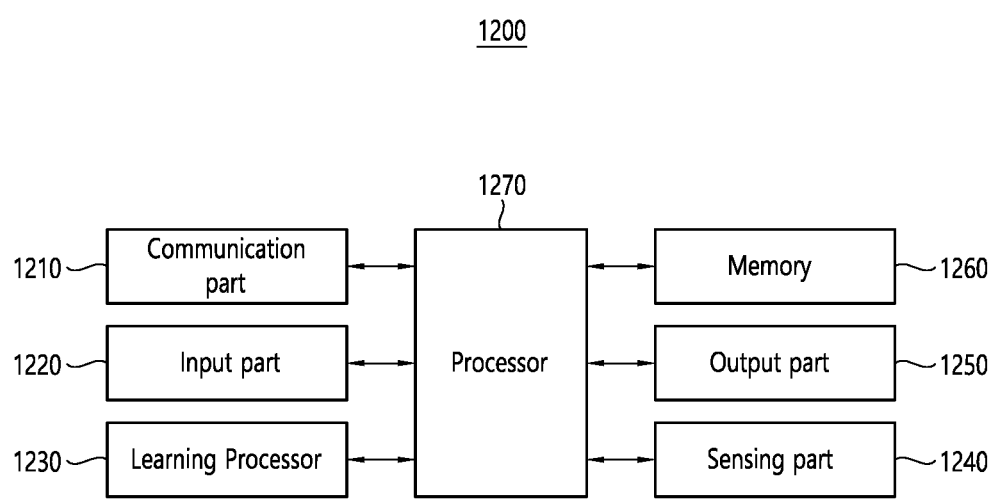
FIG. 12 shows an example of an AI device to which the technical features of the present disclosure can be applied.

FIG. 12 shows an example of an AI device to which the technical features of the present disclosure can be applied.

The AI device 1200 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 12, the AI device 1200 may include a communication part 1210, an input part 1220, a learning processor 1230, a sensing part 1240, an output part 1250, a memory 1260, and a processor 1270.

The communication part 1210 can transmit and/or receive data to and/or from external devices such as the AI devices and the AI server using wire and/or wireless communication technology. For example, the communication part 1210 can transmit and/or receive sensor information, a user input, a learning model, and a control signal with external devices. The communication technology used by the communication part 1210 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1220 can acquire various kinds of data. The input part 1220 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1220 can acquire input data to be used when acquiring an output using learning data and a learning model for model learning. The input part 1220 may obtain raw input data, in which case the processor 1270 or the learning processor 1230 may extract input features by preprocessing the input data.

The learning processor 1230 may learn a model composed of an ANN using learning data. The learned ANN can be referred to as a learning model. The learning model can be used to infer result values for new input data rather than learning data, and the inferred values can be used as a basis for determining which actions to perform. The learning processor 1230 may perform AI processing together with the learning processor of the AI server. The learning processor 1230 may include a memory integrated and/or implemented in the AI device 1200. Alternatively, the learning processor 1230 may be implemented using the memory 1260, an external memory directly coupled to the AI device 1200, and/or a memory maintained in an external device.

The sensing part 1240 may acquire at least one of internal information of the AI device 1200, environment information of the AI device 1200, and/or the user information using various sensors. The sensors included in the sensing part 1240 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1250 may generate an output related to visual, auditory, tactile, etc. The output part 1250 may include a display for outputting visual information, a speaker for outputting auditory information, and/or a haptic module for outputting tactile information.

The memory 1260 may store data that supports various functions of the AI device 1200. For example, the memory 1260 may store input data acquired by the input part 1220, learning data, a learning model, a learning history, etc.

The processor 1270 may determine at least one executable operation of the AI device 1200 based on information determined and/or generated using a data analysis algorithm and/or a machine learning algorithm. The processor 1270 may then control the components of the AI device 1200 to perform the determined operation. The processor 1270 may request, retrieve, receive, and/or utilize data in the learning processor 1230 and/or the memory 1260, and may control the components of the AI device 1200 to execute the predicted operation and/or the operation determined to be desirable among the at least one executable operation. The processor 1270 may generate a control signal for controlling the external device, and may transmit the generated control signal to the external device, when the external device needs to be linked to perform the determined operation. The processor 1270 may obtain the intention information for the user input and determine the user's requirements based on the obtained intention information. The processor 1270 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1230 and/or learned by the learning processor of the AI server, and/or learned by their distributed processing. The processor 1270 may collect history information including the operation contents of the AI device 1200 and/or the user's feedback on the operation, etc. The processor 1270 may store the collected history information in the memory 1260 and/or the learning processor 1230, and/or transmit to an external device such as the AI server. The collected history information can be used to update the learning model. The processor 1270 may control at least some of the components of AI device 1200 to drive an application program stored in memory 1260. Furthermore, the processor 1270 may operate two or more of the components included in the AI device 1200 in combination with each other for driving the application program.

Figure 13:
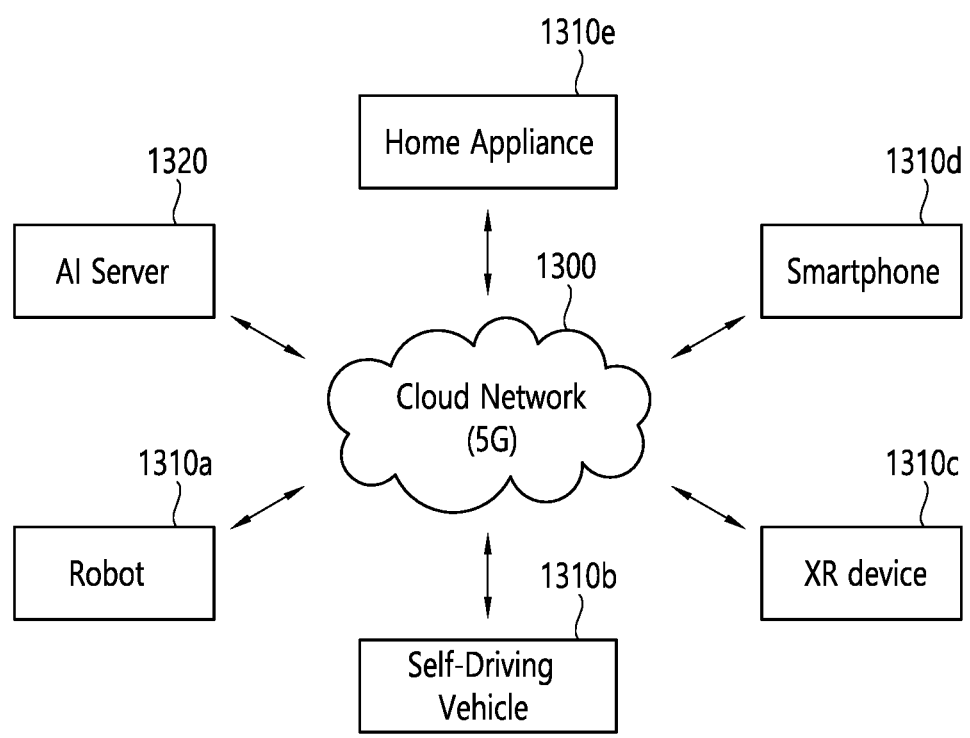
FIG. 13 shows an example of an AI system to which the technical features of the present disclosure can be applied.

FIG. 13 shows an example of an AI system to which the technical features of the present disclosure can be applied.

Referring to FIG. 13, in the AI system, at least one of an AI server 1320, a robot 1310a, an autonomous vehicle 1310b, an XR device 1310c, a smartphone 1310d and/or a home appliance 1310e is connected to a cloud network 1300. The robot 1310a, the autonomous vehicle 1310b, the XR device 1310c, the smartphone 1310d, and/or the home appliance 1310e to which the AI technology is applied may be referred to as AI devices 1310a to 1310e.

The cloud network 1300 may refer to a network that forms part of a cloud computing infrastructure and/or resides in a cloud computing infrastructure. The cloud network 1300 may be configured using a 3G network, a 4G or LTE network, and/or a 5G network. That is, each of the devices 1310a to 1310e and 1320 consisting the AI system may be connected to each other through the cloud network 1300. In particular, each of the devices 1310a to 1310e and 1320 may communicate with each other through a base station, but may directly communicate with each other without using a base station.

The AI server 1320 may include a server for performing AI processing and a server for performing operations on big data. The AI server 1320 is connected to at least one or more of AI devices constituting the AI system, i.e. the robot 1310a, the autonomous vehicle 1310b, the XR device 1310c, the smartphone 1310d and/or the home appliance 1310e through the cloud network 1300, and may assist at least some AI processing of the connected AI devices 1310a to 1310e. The AI server 1320 can learn the ANN according to the machine learning algorithm on behalf of the AI devices 1310a to 1310e, and can directly store the learning models and/or transmit them to the AI devices 1310a to 1310e. The AI server 1320 may receive the input data from the AI devices 1310a to 1310e, infer the result value with respect to the received input data using the learning model, generate a response and/or a control command based on the inferred result value, and transmit the generated data to the AI devices 1310a to 1310e. Alternatively, the AI devices 1310a to 1310e may directly infer a result value for the input data using a learning model, and generate a response and/or a control command based on the inferred result value.

Various embodiments of the AI devices 1310a to 1310e to which the technical features of the present disclosure can be applied will be described. The AI devices 1310a to 1310e shown in FIG. 13 can be seen as specific embodiments of the AI device 1200 shown in FIG. 12.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
receiving, from a Master Node (MN), a radio resource control (RRC) reconfiguration message for a Primary Cell (PCell) on a first frequency, wherein the PCell is included in a Master Cell Group (MCG);
receiving, from a Secondary Node (SN), an RRC reconfiguration message fora Secondary Cell Group (SCG) on a second frequency, wherein a SCell is included in an SCG;
configuring a split bearer for the PCell and the SCG cell, wherein a Packet Data Convergence Protocol (PDCP) entity is configured for the split bearer, and
wherein a first Radio Link Control (RLC) entity for the PCell and a second RLC entity for the SCG cell is configured for the split bearer; activating packet duplication in the PDCP entity associated with the first RLC entity and the second RLC entity;
submitting a first duplicated data both to the first RLC entity and the second RLC entity;
transmitting the first duplicated data both to the PCell through the first RLC entity and to the SCG cell through the second RLC entity; and
performing measurements of a congestion level on the first frequency and the second frequency;
based on the congestion level of the first frequency is equal to or greater than a threshold:
deactivating the packet duplication on the PDCP entity;
submitting a second data only to the second RLC entity; and
transmitting the second data only to the SCG cell through the second RLC entity.

2. The method of claim 1, wherein the congestion level is determined based on listen-before-talk (LBT) failures.

3. The method of claim 1, wherein the congestion level is determined based on a channel busy ratio (CBR) and/or received signal strength indicator (RSSI).

4. The method of claim 1, wherein the wireless device is in communication with at least one of a user equipment, a network, or an autonomous vehicle other than the wireless device.

5. A wireless device in a wireless communication system comprising:
a transceiver;
a memory;
and at least one processor operatively coupled to the transceiver and the memory, and configured to:
receive, from a Master Node (MN), a radio resource control (RRC) reconfiguration message fora Primary Cell (PCell) on a first frequency, wherein the PCell is included in a Master Cell Group (MCG);
receive, from a Secondary Node (SN), an RRC reconfiguration message for a Secondary Cell Group (SCG) on a second frequency, wherein a SCell is included in an SCG;
configure a split bearer for the PCell and the SCG cell, wherein a Packet Data Convergence Protocol (PDCP) entity is configured for the split bearer, and
wherein a first Radio Link Control (RLC) entity for the PCell and a second RLC entity for the SCG cell is configured for the split bearer;
activate packet duplication in the PDCP entity associated with the first RLC entity and the second RLC entity;
submit a first duplicated data both to the first RLC entity and the second RLC entity;
transmit the first duplicated data both to the PCell through the first RLC entity and to the SCG cell through the second RLC entity; and
perform measurements of a congestion level on the first frequency and the second frequency;
based on the congestion level of the first frequency is equal to or greater than a threshold:
deactivate the packet duplication on the PDCP entity;
submit a second data only to the second RLC entity; and
transmit the second data only to the SCG cell through the second RLC entity.

6. A processor for a wireless device in a wireless communication system, wherein the processor is configured to control the wireless device to perform operations comprising:
receiving, from a Master Node (MN), a radio resource control (RRC) reconfiguration message for a Primary Cell (PCell) on a first frequency, wherein the PCell is included in a Master Cell Group (MCG);

receiving, from a Secondary Node (SN), an RRC reconfiguration message for a Secondary Cell Group (SCG) on a second frequency, wherein a SCell is included in an SCG;

configuring a split bearer for the PCell and the SCG cell, wherein a Packet Data Convergence Protocol (PDCP) entity is configured for the split bearer, and wherein a first Radio Link Control (RLC) entity for the PCell and a second RLC entity for the SCG cell is configured for the split bearer;

activating packet duplication in the PDCP entity associated with the first RLC entity and the second RLC entity;

submitting a first duplicated data both to the first RLC entity and the second RLC entity;

transmitting the first duplicated data both to the PCell through the first RLC entity and to the SCG cell through the second RLC entity; and performing measurements of a congestion level on the first frequency and the second frequency;

based on the congestion level of the first frequency is equal to or greater than a threshold:
 deactivating the packet duplication on the PDCP entity;
 submitting a second data only to the second RLC entity; and
 transmitting the second data only to the SCG cell through the second RLC entity.

* * * * *